US010261789B2

(12) United States Patent
Reid et al.

(10) Patent No.: US 10,261,789 B2
(45) Date of Patent: Apr. 16, 2019

(54) DATA PROCESSING APPARATUS AND METHOD FOR CONTROLLING PERFORMANCE OF SPECULATIVE VECTOR OPERATIONS

(71) Applicant: ARM LIMITED, Cambridge (GB)

(72) Inventors: Alastair David Reid, Fulbourn (GB); Daniel Kershaw, Gratkorn (AT)

(73) Assignee: ARM Limited, Cambridge (GB)

( * ) Notice: Subject to any disclaimer, the term of this patent is extended or adjusted under 35 U.S.C. 154(b) by 868 days.

(21) Appl. No.: 14/461,664

(22) Filed: Aug. 18, 2014

(65) Prior Publication Data

US 2015/0100755 A1  Apr. 9, 2015

(30) Foreign Application Priority Data

Oct. 9, 2013 (GB) .................................. 1317876.9

(51) Int. Cl.
*G06F 9/312* (2018.01)
*G06F 9/455* (2018.01)
(Continued)

(52) U.S. Cl.
CPC ...... *G06F 9/30036* (2013.01); *G06F 9/30043* (2013.01); *G06F 9/30065* (2013.01); *G06F 15/78* (2013.01); *G06F 9/45533* (2013.01)

(58) Field of Classification Search
CPC ............. G06F 9/30036; G06F 9/30045; G06F 9/30065; G06F 915/78; G06F 9/30043
(Continued)

(56) References Cited

U.S. PATENT DOCUMENTS 5,511,217 A * 4/1996 Nakajima ........... G06F 9/45533
712/2
6,915,395 B1 * 7/2005 Singh .................... G06F 9/3834
711/108
(Continued)

FOREIGN PATENT DOCUMENTS

CN       1349159      5/2002
JP     2011-065522    3/2011
(Continued)

OTHER PUBLICATIONS

U.S. Appl. No. 14/462,194, filed Aug. 18, 2014, Reid et al.
(Continued)

*Primary Examiner* — Daniel H Pan
(74) *Attorney, Agent, or Firm* — Nixon & Vanderhye P.C.

(57) ABSTRACT

A data processing apparatus and a method of controlling performance of speculative vector operations are provided. The apparatus comprises processing circuitry for performing a sequence of speculative vector operations on vector operands, each vector operand comprising a plurality of vector elements, and speculation control circuitry for maintaining a speculation width indication indicating the number of vector elements of each vector operand to be subjected to the speculative vector operations. The speculation width indication is set to an initial value prior to performance of the sequence of speculative vector operations. The processing circuitry generates progress indications during performance of the sequence of speculative vector operations, and the speculation control circuitry detects, with reference to the progress indications and speculation reduction criteria, presence of a speculation reduction condition. The speculation reduction condition is a condition indicating that a reduction in the speculation width indication is expected to improve at least one performance characteristic of the data processing apparatus relative to continued operation without the reduc-
(Continued)

tion in the speculation width indication. The speculation control circuitry is responsive to detection of the speculation reduction condition to reduce the speculation width indication. This can significantly increase performance (for example in terms of throughput and/or energy consumption) when performing speculative vector operations.

28 Claims, 16 Drawing Sheets

(51) Int. Cl.
  *G06F 9/38* (2018.01)
  *G06F 15/76* (2006.01)
  *G06F 9/30* (2018.01)
  *G06F 15/78* (2006.01)

(58) Field of Classification Search
  USPC .......................................... 712/7, 241; 718/1
  See application file for complete search history.

(56) References Cited

U.S. PATENT DOCUMENTS

| | | | |
|---|---|---|---|
| 7,395,419 | B1 | 7/2008 | Gonion |
| 7,395,496 | B2 | 7/2008 | Peretz et al. |
| 7,606,979 | B1 | 10/2009 | Rozas et al. |
| 7,739,456 | B1 | 6/2010 | Cypher et al. |
| 7,961,636 | B1 * | 6/2011 | Barach ............... H04L 12/4625 370/252 |
| 8,572,341 | B2 | 10/2013 | Blundell |
| 2004/0215941 | A1 | 10/2004 | Thimmannagari |
| 2005/0204119 | A1 | 9/2005 | Saha |
| 2006/0259737 | A1 | 11/2006 | Sachs et al. |
| 2008/0288744 | A1 * | 11/2008 | Gonion ............... G06F 9/30072 711/210 |
| 2008/0288745 | A1 | 11/2008 | Gonion et al. |
| 2008/0288754 | A1 | 11/2008 | Gonion et al. |
| 2008/0288759 | A1 | 11/2008 | Gonion et al. |
| 2009/0288075 | A1 | 11/2009 | Song et al. |
| 2012/0131309 | A1 | 5/2012 | Johnson |
| 2013/0262833 | A1 | 10/2013 | Gonion |
| 2014/0189321 | A1 | 7/2014 | Uliel |

FOREIGN PATENT DOCUMENTS

| | | |
|---|---|---|
| JP | 2011-118743 | 6/2011 |
| JP | 2013-175201 | 9/2013 |
| TW | 201140452 | 11/2011 |
| TW | 201301032 | 1/2013 |
| WO | 02/084451 | 10/2002 |
| WO | 2013/095608 | 6/2013 |

OTHER PUBLICATIONS

International Search Report and Written Opinion of the International Searching Authority dated Dec. 12, 2014 in PCT/GB2014/052508, 13 pages.
R. Kumar et al, "Dynamic Selective Devectorization for Efficient Power Gating of SIMD units in a HW/SW Co-designed Environment" 25th International Symposium on Computer Architecture and High Performance Computing, Oct. 2013, pp. 81-88.
J.L. Hennessy et al "Computer Architecture—A Quantitative Approach" 4th Edition, Appendix F (K. Asanovic), 2007, 62 pages.
International Search Report and Written Opinion of the International Searching Authority dated Dec. 23, 2014 in PCT/GB2014/052507, 8 pages.
Search Report for GB1317876.9 dated Feb. 24, 2014, 1pg.
Ciricescu et al., "The Reconfigurable Streaming Vector Processor (RSVP™)", *IEEE Computer Society—Micro-36*, 2003, 10 pgs.
Espasa et al., "Quantitative Analysis of Vector Code", *Universitat Politecnica de Catalunya*, No Date, 12 pgs.
Gebis et al., "Embracing and Extending 20th—Century Instruction Set Architectures", *IEEE Computer Society*, Apr. 2007, pp. 68-75.
Gee et al., "The Performance Impact of Vector Processor Caches", *Computer Science Division—University of California*, Dec. 1990, 24 pgs.
Espasa et al., "Vector Architectures: Past, Present and Future", *Universitat Politecnica de Catalunya*, No Date, 8 pgs.
D. Martin, Vector Extensions to the MIPS-IV Instruction Set Architecture (V-IRAM Architecture Manual) Revision 3.7.5, No Date, 304 pgs.
C. Kozyrakis, "Scalable Vector Media-processors for Embedded Systems", *Computer Science Division—University of California*, May 2002, 150 pgs.
R. Russell, "The CRAY-1 Computer System", *Communications of the ACM*, vol. 21, No. 1, Jan. 1978, pp. 63-72.
Espasa et al., "Out-of-Order Vector Architectures", *Universitat Politecnica de Catalunya*, No Date, 11 pgs.
Smith et al., "Vector Instruction Set Support for Conditional Operations", *ISCA '00*, 2000, pp. 260-269.
Pajuelo et al., "Speculative Dynamic Vectorization", *ISCA 02*, 2002, 10 pgs.
K. Asanovic, "Vector Microprocessors", *Dissertation—University of California*, 1998, 268 pgs.
Kozyrakis et al., "Vector Vs. Superscalar and VLIW Architectures for Embedded Multimedia Benchmarks", *IEEE*, 2002, pp. 283-293.
Sujon et al., "Vectorization Past Dependent Branches Through Speculation", *IEEE*, 2013, pp. 353-362.
J. Yu, "Vector Processing as a Soft-CPU Accelerator", *Thesis—Simon Frasier University*, 2005, 127 pgs.
Notice of Allowance dated Jun. 29, 2016 in co-pending U.S. Appl. No. 14/462,194 14 pages.
English translation of Chinese First Office Action dated Dec. 26, 2017 in CN 201480054729.5, 6 pages.
European Office Action dated May 11, 2017 in EP 14753139.6, 7 pages.
Office Action dated Aug. 16, 2018 in IL Application No. 244408, 3 pages.
English translation of Second Office Action dated Sep. 4, 2018 in CN Application No. 201480054729.5, 1 page.
Taiwanese Office Action dated Apr. 27, 2018 in TW Application No. 103130434 and English translation, 21 pages.
English translation of Japanese Office Action and list of cited references dated May 29, 2018 in JP Application No. 2016-519799, 5 pages.

* cited by examiner

VECTORIZE

START SPECULATION
VOP 1 (SPECULATION WIDTH)
VOP 2 (SPECULATION WIDTH)
.
.
VOP M (SPECULATION WIDTH)
CONDITION TEST/COMMIT/SET MASK

VOP M+1 (MASK)
.
.
VOP N (MASK)
CONDITIONAL EXIT

LOOP:       SPECULATE

ONE OF MORE INSTRUCTIONS
TO DETERMINE APPROPRIATE
WIDTH TO COMMIT

COMMIT

BRANCH <COND> LOOP

EXIT:

DATA PROCESSING APPARATUS AND METHOD FOR CONTROLLING PERFORMANCE OF SPECULATIVE VECTOR OPERATIONS

BACKGROUND

This application claims priority to GB Patent Application No. 1317876.9 filed 9 Oct. 2013, the entire content of which is hereby incorporated by reference.

The present invention relates to a data processing apparatus and method for controlling performance of speculative vector operations.

One known technique for improving performance of a data processing apparatus is to provide circuitry to support execution of vector operations. Vector operations are performed on at least one vector operand, where each vector operand comprises a plurality of vector elements. Performance of the vector operation then involves applying an operation repetitively across the various vector elements within the vector operand(s).

In typical data processing systems that support performance of vector operations, a vector register bank will be provided for storing the vector operands. Hence, by way of example, each vector register within a vector register bank may store a vector operand comprising a plurality of vector elements.

In high performance implementations, it is also known to provide vector processing circuitry (often referred to as SIMD (Single Instruction Multiple Data) processing circuitry) which can perform the required operation in parallel on the various vector elements within the vector operands. In an alternative embodiment, scalar processing circuitry can still be used to implement the vector operation, but in this instance the vector operation is implemented by iterative execution of an operation through the scalar processing circuitry, with each iteration operating on different vector elements of the vector operands.

Through the use of vector operations, significant performance benefits can be realised when compared with the performance of an equivalent series of scalar operations.

When seeking to gain the performance benefits of vector processing, it is known to seek to vectorise a series of scalar operations in order to replace them with an equivalent series of vector operations. For example, for a loop containing a series of scalar instructions, it may be possible to vectorise that loop by replacing the series of scalar instructions with an equivalent series of vector instructions, with the vector operands containing, as vector elements, elements relating to different iterations of the original scalar loop.

However, whilst such an approach can work well when the number of iterations required through the original scalar loop is predetermined, it is more difficult to vectorise such loops when the number of iterations is not predetermined. In particular, since the number of iterations is not predetermined, it cannot be predetermined how many vector elements will be required in each vector operand.

In some situations of the above type, it is possible to perform speculative vector processing, where a speculation is made as to the required number of vector elements, and remedial action is taken later when the exact number of vector elements required is determined.

The Ph.D. thesis entitled "Vector Microprocessors" by K Asanovic, Berkeley, 1998, pp. 116-121, discusses performing speculation across the entire width of the vector operands, and additionally keeping track of architectural events (for example page faults) that occur during speculation. Such architectural events will trigger an exception, causing an exception routine to be executed by the operating system in order to resolve the exception. The proposed approach keeps a record of each vector element position within the vector width where such an architectural event was detected. Later, when a commit point is reached where the required set of vector element positions is known, each required vector element position is compared against this record of architectural events. Since any architectural events associated with required vector element positions will prevent the vector processing circuitry from correctly performing vector operations, any such deferred exceptions are triggered at the commit point. If none of the required set of vector element positions is associated with an architectural event, then the vector length and mask are updated and the record of architectural events is cleared.

The above process allows speculative vector processing to be performed, whilst ensuring correct operation by masking out architectural events at the commit point.

However, whilst the above approach can ensure correct operation whilst performing speculative vector processing operations, there are other factors that can affect the benefits of performing speculative vector processing. As mentioned earlier, at the time the speculation is performed, the number of iterations required is not known, and hence there is the possibility of performing certain operations that may adversely impact a performance characteristic of the apparatus (for example throughput or energy consumption), only later to find out that those operations were not required. Accordingly, it would be desirable to provide a mechanism for performing speculative vector operations whilst managing the impact of such speculative vector processing on a performance characteristic of the apparatus.

SUMMARY

Viewed from a first aspect, the present invention provides a data processing apparatus comprising: processing circuitry configured to perform a sequence of speculative vector operations on vector operands, each vector operand comprising a plurality of vector elements; speculation control circuitry configured to maintain a speculation width indication indicating the number of vector elements of each vector operand to be subjected to said speculative vector operations, the speculation width indication being initialised to an initial value prior to performance of said sequence of speculative vector operations; said processing circuitry being configured to generate progress indications during performance of said sequence of speculative vector operations; the speculation control circuitry being further configured to detect, with reference to the progress indications and speculation reduction criteria, presence of a speculation reduction condition, the speculation reduction condition being a condition indicating that a reduction in the speculation width indication is expected to improve at least one performance characteristic of the data processing apparatus relative to continued operation without the reduction in the speculation width indication; the speculation control circuitry being further responsive to detection of said speculation reduction condition to reduce the speculation width indication.

By configuring the processing circuitry to generate progress indications during performance of the sequence of speculative vector operations, this allows the speculation control circuitry to assess those progress indications against speculation reduction criteria (which may be fixed criteria, or may be criteria stored for access by the speculation control circuitry and reconfigurable) in order to determine situations where the current speculation width appears to be having a significant adverse effect on a chosen performance characteristic of the data processing apparatus (for example throughput or energy consumption). On detection of such a situation, the speculative control circuitry is then configured to reduce the speculation width indication to thereby reduce the number of vector elements of each vector operand to be subjected to the speculative vector operations.

The progress indications will typically be arranged so as to allow the speculation control circuitry to identify any vector element positions where performance of the speculative vector operations is adversely affecting the performance characteristic. For example, each progress indication may specifically identify the vector element position to which the progress indication relates.

Purely by way of example, if a progress indication identifies that a particular vector element to be loaded from memory at element position x during performance of a speculative vector load operation has resulted in a cache miss at a certain cache level within a cache hierarchy of the system, the speculation reduction criteria may identify an expected latency to be associated with such a cache miss event, or may directly identify that occurrence of such an event indicates a speculation reduction condition. Whilst speculative vector processing could still correctly continue to be performed at the currently specified speculation width, this could significantly affect performance due to the latency introduced by the cache miss, and by reducing the speculation width at this point to exclude element position x and higher, this latency can be avoided. Subsequently, the sequence of vector operations could be repeated if desired, to seek to perform the vector operations in respect of the omitted vector elements, and it may be that due to the time at which that sequence of vector operations is repeated, the same latency issues do not arise (for example by that time the required data element may be present in the cache and a cache miss may hence not arise).

Hence, through use of the present invention, at least one performance characteristic of the data processing apparatus can be improved whilst performing speculative vector operations, by seeking to avoid situations where performance of the speculative vector operations at a particular speculation width will have an undue adverse impact on that chosen performance characteristic.

The progress indications can take a variety of forms. In one embodiment, the progress indications are indicative of throughput impacting events occurring within the processing circuitry during performance of the speculative vector operations. Alternatively, or in addition, the progress indications may be indicative of energy consumption impacting events occurring within the processing circuitry during performance of the speculative vector operations. Whilst in one embodiment, the impacting events indicated by the progress indications are events that are having a negative impact on the performance characteristic, in one embodiment the impacting events may also identify events that are having a positive impact on the performance characteristic, for example particular operations that are being performed more quickly, or consuming less energy, than expected.

The events that trigger the generation of the progress indications can take a variety of forms. In one embodiment, at least some of the progress indications are issued in response to micro-architectural events occurring within the processing circuitry during performance of the speculative vector operations.

A feature, component or behaviour of a processor can be considered to be "micro-architectural" if it only affects the quality of an implementation (e.g. causes a processor to use more or less time or energy to run a program) but not the correctness of an implementation (i.e. whether it correctly implements the instruction set architecture). For example, modern processors use branch predictors to accelerate branches, caches to accelerate memory reads, write buffers to accelerate memory writes, translation lookaside buffers to accelerate page table lookups, and pipelines to accelerate execution of sequences of instructions. These features can all be considered to be micro-architectural features because they accelerate execution but do not affect the final outcome of the program.

This should be contrasted with features, components or behaviour of a processor that affect the correctness of an implementation, such features, components or behaviour being considered to be "architectural". For example, modern processors use page tables and page fault exceptions to implement virtual memory, interrupts to support context switching, and arithmetic exceptions to handle arithmetic error conditions such as "divide by zero". Architectural features, components or behaviour give rise to architectural events that typically affect program execution, for example by causing additional instructions to be executed. In contrast, micro-architectural features, components or behaviour give rise to micro-architectural events which affect the behaviour of the microarchitecture, but do not have any effect at the architectural level. They may for example cause the program to run a little slower than otherwise, but do not affect program execution.

The speculation width indication can take a variety of forms. For example, the speculation width indication can be specified by a mask or by the contents of one or more registers identifying particular element positions, for example a start element position and/or an end element position. In one embodiment, the speculation width indication indicates not only the number of vector elements of each vector operand to be subjected to the speculative vector operations, but further identifies a first vector element of each vector operand to be subjected to said speculative vector operations.

Whilst the number of vector elements to be subjected to the speculative vector operations need not occupy a series of adjacent vector element positions, in one embodiment the speculation width indication does identify the number of vector elements of each vector operand to be subjected to said speculative vector operations as being a specified number of sequential vector elements starting from said first vector element.

In one embodiment, the processing circuitry is configured to execute a vector loop of instructions, the vector loop including instructions defining said sequence of vector operations and at least one evaluation instruction executed at a commit point within the vector loop following performance of said sequence of vector operations, execution of said at least one evaluation instruction causing a required vector width to be determined. Further, the speculation control circuitry is responsive to determination of the required vector width to determine with reference to a current value of the speculation width indication whether performance of said sequence of vector operations resulted in an over-speculation or an under-speculation, and in the event of said under-speculation to set a repeat flag to cause a further iteration of said vector loop of instructions to be executed. Hence, the speculation width can be varied as desired during performance of the speculative vector operations, with subsequent iterations of the sequence of speculative vector operations being performed as required to ensure that the vector operations are ultimately performed for all of the required vector elements.

In one embodiment, upon a further iteration of the vector loop of instructions, the speculation control circuitry is configured to initialise the speculation width indication to a modified initial value having regard to the number of vector elements processed during the preceding iteration of the vector loop of instructions.

In one embodiment, the vector loop includes one or more non-speculative instructions to be executed after the commit point, the speculation control circuitry further being configured to set a mask value to identify the number of vector elements of each vector operand to be subjected to the non-speculative operations defined by said one or more non-speculative instructions. In one embodiment, in the event of under-speculation this mask will be set to identify the value of the speculation width that existed at the commit point, whereas in the event of over-speculation the mask will be set to identify the required vector width as determined at the commit point.

In one embodiment, the data processing apparatus includes a vector register bank configured to store the vector operands for access by the processing circuitry, and the processing circuitry includes data access circuitry configured to perform vector access operations in order to move vector operands between the vector register bank and a memory system including at least one level of cache storage. In such an embodiment, the data access circuitry may be configured to issue as progress indications information relating to cache misses occurring during performance of the vector access operations. Such cache misses can give rise to significant latency, and accordingly can provide useful information when deciding whether to reduce speculation width.

In one embodiment, the data processing apparatus further comprises a translation lookaside buffer (TLB) referenced by the data access circuitry during performance of the vector access operations, the data access circuitry further being configured to issue as progress indications information relating to TLB misses occurring during performance of the vector access operations. TLB misses can also give rise to significant latency, since in that event it may be necessary to perform a "page table walk" process in order to retrieve from memory the required page table information for storage within the TLB, and hence indications of TLB misses can also provide useful information when deciding whether to reduce speculation width.

Whilst the above two examples of progress indications relate to the activities of the data access circuitry, it will be appreciated that other components of the processing circuitry may also be arranged to provide progress indications to the speculation control circuitry. Indeed, in addition to progress indications being issued by the processing circuitry that is performing the speculative vector operations, progress indications may also be issued by other components within the system, for example scalar circuitry that is configured to perform scalar operations, since it may be that the speculative vector operations being performed have a performance impact on those other components within the system. For example, if a speculative loop contains a large number of operations (whether vector or scalar), then those operations will have to be repeated if the speculation width is reduced by too much. Tracking the number of scalar and vector operations performed allows this potential repetition cost to influence the decision to reduce speculation width.

In one embodiment, the data processing circuitry is responsive to a reduction in the speculation width indication to alter the number of vector elements of each vector operand subjected to selected vector operations occurring in said sequence starting with the vector operation whose progress indications resulted in detection of the speculation reduction condition that caused the speculation width indication to be reduced. In one particular embodiment, the selected vector operations include the vector operation whose progress indication resulted in the speculation width reduction, and all subsequent vector operations in the sequence.

Furthermore, in one embodiment, this approach can be extended to additionally alter the number of vector elements of each vector operand subjected to non-completed vector operations occurring in the sequence before the vector operation whose progress indications resulted in detection of the speculation reduction condition that caused the speculation width indication to be reduced. Hence, this allows retrospective trimming of the number of vector elements subjected to previously issued vector operations that are still in progress at the time the speculation width indication is reduced. This can hence reduce energy consumption that may otherwise be consumed in completing those previously issued speculative vector operations.

In one embodiment, the data processing apparatus further comprises control circuitry configured to be responsive to reduction in the speculation width indication to reduce power consumption within one or more components of the processing circuitry. This can be achieved in a variety of ways, but in one embodiment the control circuitry employs at least one of clock gating and power gating to reduce power consumption within said one or more components. Hence, if a clock gating mechanism is used, certain components within the processing circuitry can have their clock signal removed in order to prevent them consuming power in the performance of speculative vector operations on element positions now outside of the amended speculation width. In some situations, power gating could instead be used to remove the power supply from the relevant components. In one embodiment, the control circuitry can be configured to continually receive an indication of the current speculation width, or alternatively can be configured merely to receive an indication when the speculation width has changed.

There are number of ways in which the initial value for the speculation width indication, and the speculation reduction criteria, can be specified. For example, in one embodiment, at least one of the initial value to which the speculation width indication is initialised, and the speculation reduction criteria, is specified by an instruction to be executed by the data processing apparatus. The instruction may be one of the instructions executed by the processing circuitry, or indeed may be a particular instruction executed by the speculation control circuitry, for example an instruction to initiate speculation. In an alternative embodiment, at least one of the initial value to which the speculation width indication is initialised, and the speculation reduction criteria, is predetermined.

In a yet further embodiment, the data processing apparatus may further comprise prediction circuitry configured to maintain history data relating to speculation width values used at a commit point for sequences of speculative vector operations previously performed by the processing circuitry. The prediction circuitry may then be configured, for a current sequence of speculative vector operations to be performed by the processing circuitry, to determine with reference to the history data the initial value to which the speculation width indication is to be set prior to performance of the current sequence of speculative vector operations. Alternatively, or in addition, the prediction circuitry may maintain history data relating to speculation reduction criteria used for previous sequences of speculative vector operations, and then determine with reference to that history data the speculation reduction criteria to be used for the current sequence of speculative vector operations.

The sequence of speculative vector operations can be identified in a variety of ways. For example, the instruction set may include non-speculative and speculative versions of certain vector instructions, so that particular instructions can be explicitly identified as being speculative. Alternatively, the data processing apparatus may be configured to enter and exit a speculative mode of operation, with all instructions encountered within the speculative mode of operation being executed speculatively. In one embodiment where such a speculative mode of operation is supported, the speculation control circuitry is responsive to execution of a start speculation instruction to trigger the speculative mode of operation, and the processing circuitry is configured to perform the speculative vector operations in response to instructions executed during said speculative mode of operation.

In one such embodiment, the speculation control circuitry is further responsive to execution of a commit instruction to terminate the speculative mode of operation.

In one embodiment, the speculation control circuitry is responsive to the speculation reduction condition to modify the speculation width indication to indicate that at least one vector element of each vector operand is to be subjected to the speculative vector operations. By placing a lower limit on the speculation width indication such the at least one vector element of each vector operand is processed, this ensures that forward progress is always made. When the speculation width indication identifies a single vector element, this is effectively a situation where no speculation is being performed.

Whilst the speculation reduction criteria may specify directly one or more criteria that, if met, indicate the presence of the speculation reduction condition, alternatively, or in addition, the speculation reduction criteria may comprise performance tolerance information that is maintained by the speculation control circuitry, with the speculation control circuitry being configured to adjust the performance tolerance information having regard to the progress indications generated during performance of the sequence of speculative vector operations. In one such embodiment, the performance tolerance information can be considered as providing an indication of available slack in how the performance characteristic is impacted during processing of the speculative vector operations, with that slack indication then being adjusted dependent on the progress indications received. In one embodiment, the progress indications may only indicate events having a negative impact on the chosen performance characteristic, and accordingly the slack indication will only be adjusted in one direction. However, in an alternative embodiment, the progress indications may indicate events having both negative impacts and positive impacts, and in such embodiments the slack indication may be adjusted in both directions. However the performance tolerance information (slack indication) is adjusted, the speculation control circuitry can then be configured to detect the speculation reduction condition if the performance tolerance information reaches a trigger point.

In one embodiment, the speculation control circuitry references the performance tolerance information when determining an amount by which the speculation width indication is to be reduced. This enables the amount of speculation width reduction to be dynamically managed having regards to the extent to which the performance tolerance has been exceeded.

Alternatively, an amount by which the speculation width indication is to be reduced on detection of the speculation reduction condition may be predetermined. This may be predetermined by identifying a preset number of element positions by which the speculation width is to be reduced, or may be predetermined by identifying a particular rule to be used when determining how to adjust the speculation width.

Viewed from a second aspect, the present invention provides a method of controlling performance of speculative vector operations comprising: performing a sequence of speculative vector operations on vector operands, each vector operand comprising a plurality of vector elements; maintaining a speculation width indication indicating the number of vector elements of each vector operand to be subjected to said speculative vector operations, the speculation width indication being initialised to an initial value prior to performance of said sequence of speculative vector operations; generating progress indications during performance of said sequence of speculative vector operations; detecting, with reference to the progress indications and speculation reduction criteria, presence of a speculation reduction condition, the speculation reduction condition being a condition indicating that a reduction in the speculation width indication is expected to improve at least one performance characteristic of the data processing apparatus relative to continued operation without the reduction in the speculation width indication; and on detection of said speculation reduction condition, reducing the speculation width indication.

Viewed from a third aspect, the present invention provides a computer program product storing in a non-transitory form a computer program for controlling a computer to provide a virtual machine execution environment for program instructions corresponding to a data processing apparatus in accordance with the first aspect of the present invention.

Viewed from a fourth aspect, the present invention provides a data processing apparatus comprising: processing means for performing a sequence of speculative vector operations on vector operands, each vector operand comprising a plurality of vector elements; speculation control means for maintaining a speculation width indication indicating the number of vector elements of each vector operand to be subjected to said speculative vector operations, the speculation width indication being initialised to an initial value prior to performance of said sequence of speculative vector operations; said processing means for generating progress indications during performance of said sequence of speculative vector operations; the speculation control means for detecting, with reference to the progress indications and speculation reduction criteria, presence of a speculation reduction condition, the speculation reduction condition being a condition indicating that a reduction in the speculation width indication is expected to improve at least one performance characteristic of the data processing apparatus relative to continued operation without the reduction in the speculation width indication; the speculation control means for responding to detection of said speculation reduction condition by reducing the speculation width indication.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
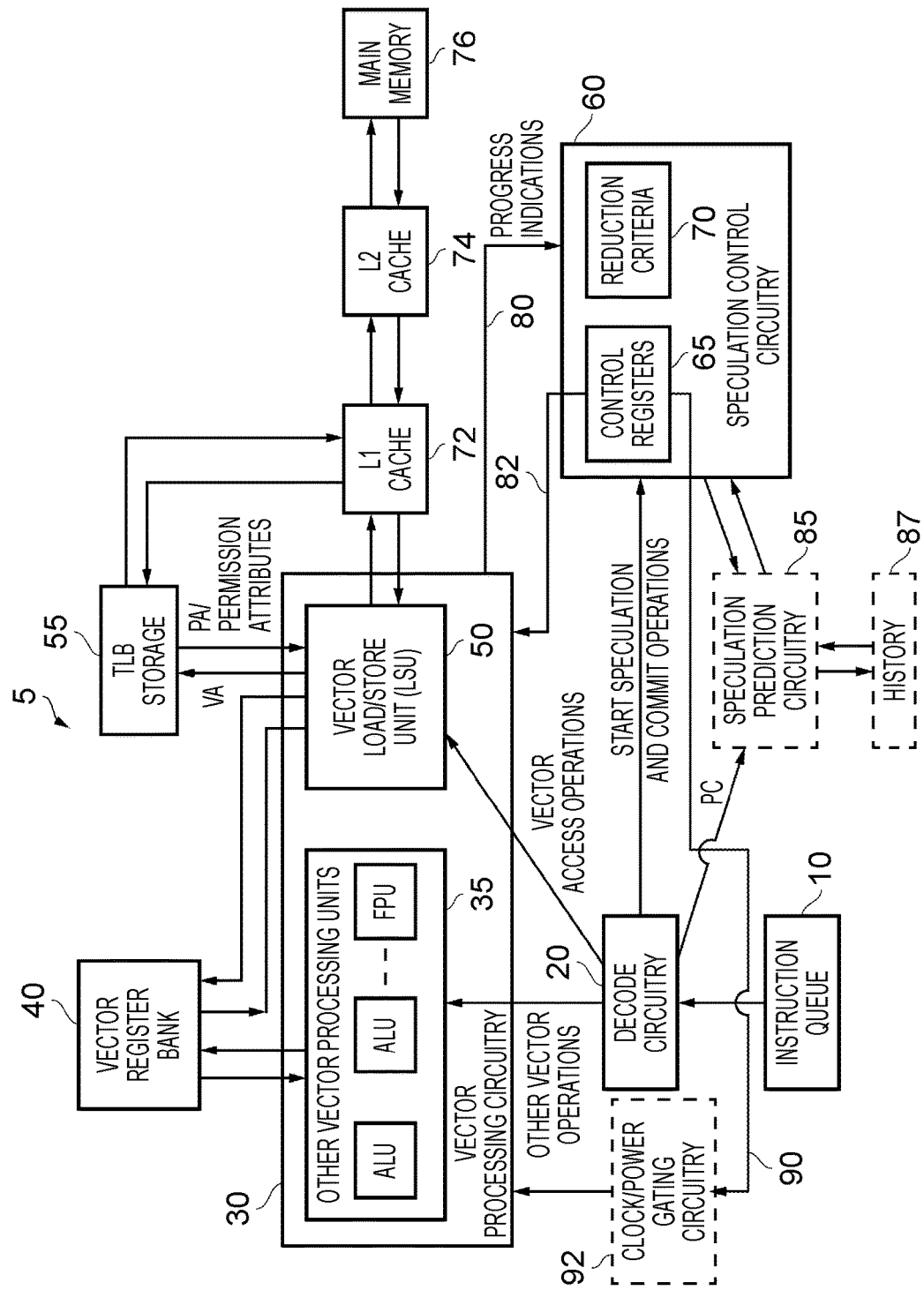
FIG. 1 is a block diagram of a data processing apparatus in accordance with one embodiment.

FIG. 1 shows a portion of a data processing apparatus 5 according to an embodiment. It only shows the vector processing portion and there may also be a scalar processing circuitry, a scalar load/store unit and a scalar register bank, such that both vector and scalar instructions can be decoded and executed.

An instruction queue 10 is provided holding instructions to be executed, these instructions being routed to decode circuitry 20 which is arranged to decode the instructions and send control signals to the appropriate circuits within the apparatus of FIG. 1. In particular, for general vector processing instructions, the decode circuitry 20 will issue control signals to the relevant vector processing units 35 within the vector processing circuitry 30, which will then perform the required vector processing operations with reference to one or more vector source operands stored within the vector register bank 40. Typically, the results of those operations are also stored back to the vector register bank 40 as one or more vector destination operands. As shown schematically in FIG. 1, the vector processing units can take a variety of forms, for example one or more arithmetic logic units (ALUs), a floating point unit (FPU), etc.

For any vector data access instructions, decoding of those instructions will cause control signals to be issued to the vector load/store unit 50 within the vector processing circuitry 30, which is configured to move one or more data operands in either direction between the vector register bank 40 and cache/memory (the cache/memory being referred to herein as a memory system). As shown for the sake of illustration, the memory system may include a hierarchical cache structure consisting of a level 1 cache 72, a level 2 cache 74, and potentially further cache levels, located between the vector register bank and main memory 76.

If the vector data access instruction is a vector load instruction, the load/store unit 50 will load at least one vector operand from the memory system into the vector register bank 40. Similarly, if the vector data access instruction is a vector store instruction, the load/store unit 50 will store at least one vector operand from the vector register bank 40 out to the memory system.

In accordance with the described embodiment, the processing circuitry 30 can be arranged to perform a sequence of speculative vector operations, with speculation control circuitry 60 being provided to maintain a speculation width indication indicating the number of vector elements of each vector operand to be subjected to the speculative vector operations. In particular, the speculation control circuitry has a number of control registers 65, in one embodiment the state of those control registers identifying when speculative operations are to be performed, and also identifying a current speculation width, that control information being passed over path 82 to the vector processing circuitry 30.

In the embodiment illustrated in FIG. 1, the sequence of instructions stored in the instruction queue 10 will include a start speculation instruction, which when decoded by the decode circuitry 20 will cause control signals to be issued to the speculation control circuitry 60 to initiate a speculation mode of operation. In particular, in one embodiment, the speculation control circuitry 60 will be responsive to such control signals to set a speculating flag within the control registers 65 to identify that the speculation mode is now active. This information will then be routed to the vector circuitry 30 via the path 82, and any subsequent operations to be executed by the vector processing circuitry 30 in accordance with the control signals received from the decode circuitry 20 will then be performed in a speculative manner, until such time as the speculation mode of operation exits. In one embodiment, the speculation mode is exited via a commit instruction which, when decoded by the decode circuitry 20, causes control signals to be sent to the speculation control circuitry 60 causing the control circuitry to clear the speculating flag.

Whilst in the described embodiment a specific speculation mode of operation is provided, there is no requirement for a specific speculation mode of operation. Instead, in an alternative embodiment, both speculative and non-speculative versions of at least a subset of the instructions in the instruction set may be provided, so that individual instructions within the sequence can be executed speculatively.

For any speculative operations performed by the vector processing circuitry 30, a speculation width indication is passed over path 82 from the control registers 65 within the speculation control circuitry 60, to identify the number of vector elements of each vector operand to be subjected to those speculative vectors operations. When speculation is initiated, the speculation width indication will be initialised to an initial value, which may for example in one embodiment be the entire vector width of an operand. Hence, purely by way of example, if a vector operand contains 16 vector elements, the initial value of the speculation width indication could be set to 16.

During performance of the speculative vector operations, the processing circuitry 30 is arranged to issue progress indications over path 80 to the speculation control circuitry 60. The progress indications provide information about the progress of the various operations being executed by the vector processing circuitry. Whilst the progress indications can be issued in a variety of ways, in one embodiment a number of events within the vector processing circuitry cause the progress indications to be output. In one embodiment, these progress indications will be indicative of throughput impacting events and/or energy consumption impacting events. In one embodiment, these events are events of the type that have a negative impact on either throughput or energy consumption. However, in an alternative embodiment, such as will be described later with reference to FIG. 13, these events can also include events that have a positive impact on throughput or energy consumption.

The type of events that give rise to such progress indications can take a variety of forms, but in one embodiment the events are micro-architectural events occurring within the processing circuitry 30 during performance of the speculative vector operations. As discussed earlier, such micro-architectural events only affect the quality of the implementation, for example by causing the processing circuitry to use more or less time or energy when running the program containing the instructions being executed, but the correctness of the implementation is not affected. Hence, the presence of the micro-architectural events themselves does not present any requirement for the operation of the circuitry to be changed. However, as will be discussed in more detail below, in accordance with the described embodiments the speculation control circuitry uses the progress indications in order to determine situations where a reduction in the speculation width is likely to improve at least one performance characteristic of the data processing apparatus relative to continued operation without such a reduction in the speculation width taking place.

In particular, the speculation control circuitry 60 has access to reduction criteria 70, which may be fixed, or alternatively may be configurable, for example via execution of an instruction within the instruction stream. There are a number of ways in which the reduction criteria can be specified. For example the speculation reduction criteria may identify expected latency and/or energy consumption to be associated with certain events reported via the progress indications, with the speculation control circuitry 60 keeping a tally of the latency and/or energy consumption related with the events received over time, and detecting a speculation reduction condition when a certain trigger point is reached. Alternatively, the reduction criteria 70 may directly identify certain events which, when they arise, indicate the presence of the speculation reduction condition.

On detecting a speculation reduction condition, through analysis of the progress indications received over path 80 against the reduction criteria 70, the speculation control circuitry 60 is configured to reduce the speculation width, at which point the content of the control registers 65 is updated to identify that reduced speculation width, causing the new speculation width to be forwarded over path 82 to the vector processing circuitry 30. This will cause the vector processing circuitry 30 to reduce the number of vector elements subjected to the ongoing vector processing operations. In particular, at least the vector operations being performed after the operation that produced the progress indication resulting in the speculation width reduction will typically be performed on a reduced number of vector elements. In one embodiment, assuming the operation that gave rise to the progress indication that caused the speculation width reduction to take place is still in progress, then the reduced speculation width can also be applied to that operation. Furthermore, in one embodiment as will be discussed later with reference to FIG. 10B, the speculation width reduction can also affect any vector operations still in progress at the time the reduction takes place, even if those operations were issued prior to the operation that gave rise to the progress indication that caused the speculation width to be reduced.

By using the progress indications to detect situations where continued operation with the current speculation width is likely to have an adverse impact on a performance characteristic such as throughput or energy consumption, speculation control circuitry can then reduce the speculation width in order to seek to avoid that impact. Any vector elements excluded from the speculative operations as a result of that speculation width reduction can then be made the subject of a subsequent iteration of the speculative vector operations if it is subsequently decided that the required vector element width is greater than the reduced speculation width.

To reduce the energy consumption of the vector processing circuitry 30 when the speculation width is reduced, clock/power gating circuitry 92 may optionally be provided, and arranged to receive via path 90 an indication of the current speculation width. Based on the current speculation width information, the clock/power gating circuitry can alter the clock or power supplied to various components within the vector processing circuitry 30. For example, if as a result of the reduction in speculation width, it is determined that certain components within the processing circuitry do not need to perform any operations for one or more clock cycles, then the clock signal may be removed from those components to reduce the power consumed by those components. If those components are not required for a longer period, then it may be appropriate to place them in a low power mode of operation, by removing or reducing the voltage supply for those components in situations where the apparatus supports dynamic voltage scaling techniques.

Any of the components within the vector processing circuitry may be arranged to produce progress indications over path 80. However, considering events that are likely to have an adverse impact on throughput, often these events are associated with cache misses that arise when performing load or store operations using the vector load/store unit (LSU) 50. In particular, if the LSU detects a cache miss within either the level 1 cache 72 or the level 2 cache 74 associated with a particular vector element position when performing a vector load or store operation, it can send a progress indication over path 80 identifying in which cache level the miss has been detected, and the element position for which the cache miss occurs. The speculation control circuitry can then use that information, in association with the reduction criteria 70, to determine whether to reduce the speculation width. The reduction criteria could for example identify that any level 2 cache miss (which typically incurs a significant latency) should result in the speculation width being reduced to exclude the vector element position giving rise to the level 2 cache miss. Alternatively, the reduction criteria 70 may effectively provide different criteria for different element positions. For example, as the element position within the vector increases, this represents a higher degree of speculation, and hence whilst cache misses associated with high element positions may immediately cause the speculation width to be reduced, cache misses associated with lower element positions need not cause the speculation width to be reduced.

Often, data processing systems use virtual addresses when accessing memory, and a TLB storage 55 is used to convert those virtual addresses into physical addresses for accessing the memory system. As will be well understood, the TLB storage 55 has a number of entries identifying specific virtual addresses, information used to convert each virtual address into a physical address, and also certain permission attribute information, such as whether that address relates to a cacheable or bufferable area of memory. The LSU will hence issue a virtual address to the TLB storage, and if a hit is detected within the TLB storage for that virtual address, the required physical address and permission attribute information can immediately be returned to the LSU. However, in the event of a miss, the TLB storage will typically need to perform a page table walk process in order to retrieve a page table from the memory system containing the required information to enable the virtual address to be translated into a physical address and to provide the associated permission attributes. During that process, the TLB storage 55 will access the level 1 cache 72 and lower levels of the memory hierarchy as required in order to retrieve the required page table information. In the event that cache misses occurring during that process, this can again be reported to the speculation control circuitry as progress indications over path 80, and used by the speculation control circuitry in order to determine whether to reduce the speculation width.

In one embodiment, both the initial value to which the speculation width indication is initialised, and the speculation reduction criteria, can be predetermined. However, alternatively they can be specified by at least one of the instructions executed by the data processing apparatus. For example, the start speculation instruction may identify the initial speculation width to be set within the control registers 65. It may also identify certain speculation reduction criteria to be used by the speculation control circuitry 60 when assessing whether to reduce the speculation width during performance of the speculative vector operations. As another option, speculation prediction circuitry 85 may be provided which is used to maintain history data relating to speculation width values and/or speculation reduction criteria used for previous sequences of speculative vector operations. With regards to the speculation width values, the history data may identify the final speculation width value present at the commit point during execution of previous sequences of speculative vector operations. The prediction circuitry can then be arranged to receive a program counter value associated with an instruction that is initiating speculation, and based thereon to reference the history data in order to determine an initial value to use for the speculation width indication, having regards to any previous sequences of speculative vector operations initiated from that program counter value, and to determine, if required, the speculation reduction criteria to be used. The history data will be stored within a history storage 87 accessible to the speculation prediction circuitry 85.

Whilst in FIG. 1 the progress indications are shown as only being issued by the vector processing circuitry 30, in an alternative embodiment the speculation control circuitry 60 can also receive progress indications from elsewhere within the system, for example from scalar processing circuitry.

Figure 2A:
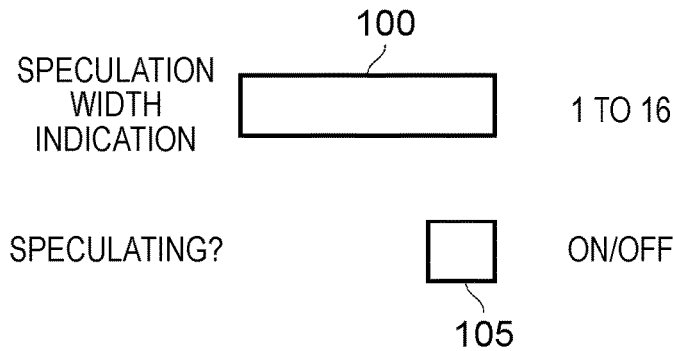
FIGS. 2A to 2C schematically illustrate various control registers provided within the speculation control circuitry of FIG. 1 in accordance with one embodiment.

The control register 65 can take a variety of forms, and FIG. 2A illustrates a number of parameters that can be stored within the control registers. Firstly, a speculation width value 100 is maintained, and in one embodiment this can take a value between one and sixteen, indicating that the number of vector elements of each vector operand to be subjected to the speculative vector operations may vary between one and sixteen vector elements (in one embodiment 16 vector elements representing the full width of the vector operands).

In one embodiment, the control registers 65 also include a speculating flag 105, which is set to indicate whether speculation is turned on or not. When speculation is off, the vector operations are performed none speculatively. However, when speculation is turned on, the vector operations are performed speculatively.

Speculation width indication 100 can be specified in a variety of ways. However, in one embodiment the control registers 65 include both a first element position register 110 and a speculation width register 115. The first element position register 110 identifies the first vector element position to be subjected to the vector processing operation, whilst the speculation width register 115 then identifies the final vector element position, the speculation width within the vector operand 120 then being indicated by the difference between the contents of these two registers.

During a first iteration of a sequence of vector operations, it may be the case that the first element position register points to the first vector element within the vector 120, and the speculation width register 115 may, for example, point to the last vector element, hence specifying the entire vector width. During performance of the vector operations, the speculation width register contents may be reduced to identify a reduced speculation width. If at the time a commit point is reached, the speculation width has been reduced below the required number of vector elements determined at the commit point, then a subsequent iteration of the vector operations can be performed, and this time the first element position register 110 will be set to identify the first required vector element that has not been processed via the previous iteration of the speculative vector operations. The speculation width register 115 will then be set to identify the required speculation width for the subsequent iteration.

Figure 2B:
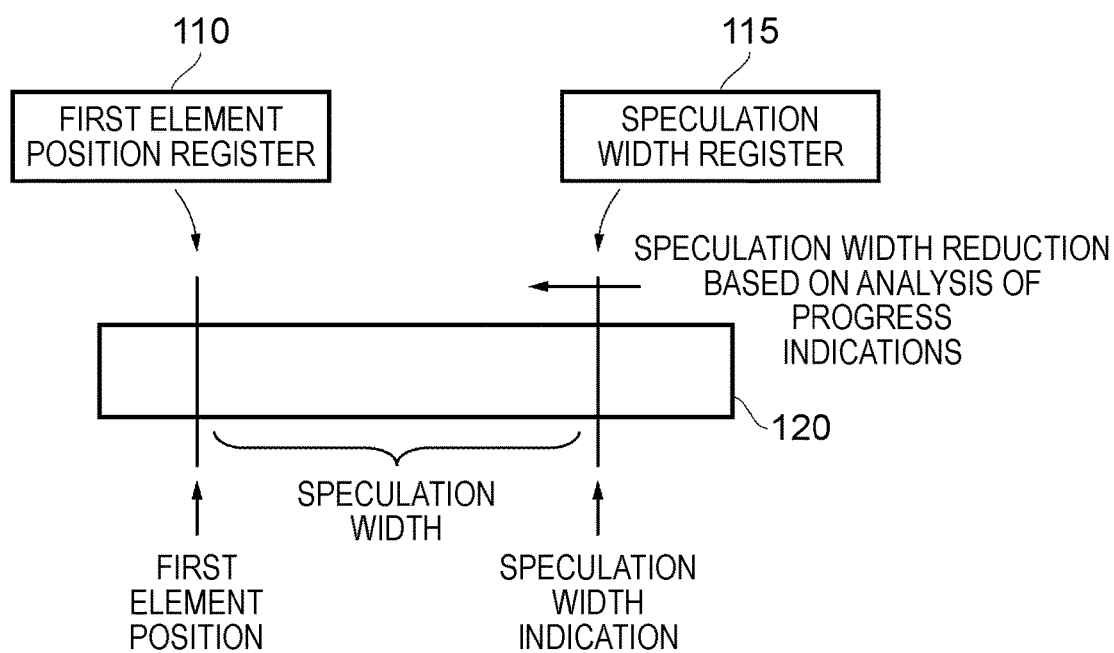
Figure 2C:
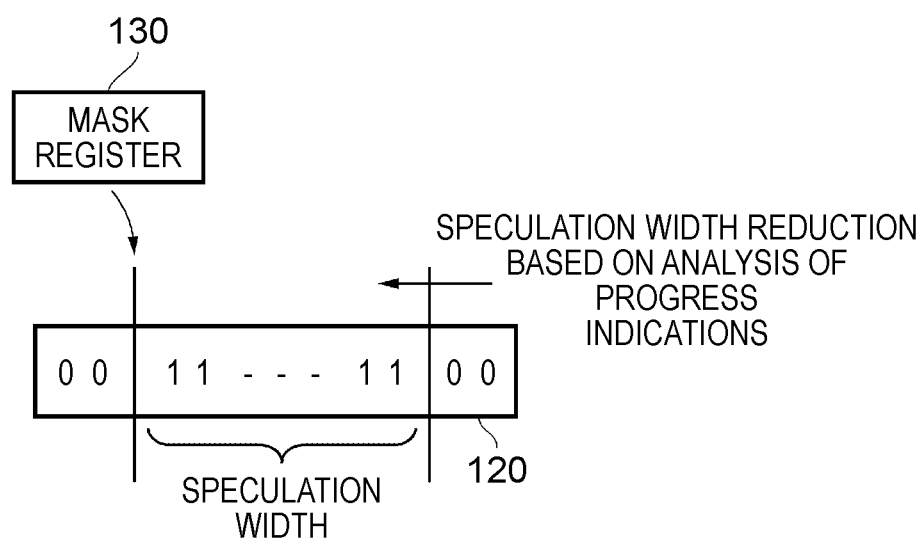

Whilst in the example of FIG. 2B, two separate registers are maintained, in an alternative embodiment, a mask register 130 may be provided to identify the speculation width indication. In particular, the mask may contain a bit for each element position within the vector operand 120, with those bits being set to zero or one to identify the speculation width. In one embodiment, the speculation width will be specified by a series of logic one values contained within the mask, with the contents of that mask being updated during performance of the operations as the speculation width is reduced, by certain of those logic one values being converted into logic zero values to identify the reduced speculation width. It will be appreciated that in alternative embodiments, the meanings ascribed to logic one and logic zero values within the mask may be reversed.

Figures 3, 4:
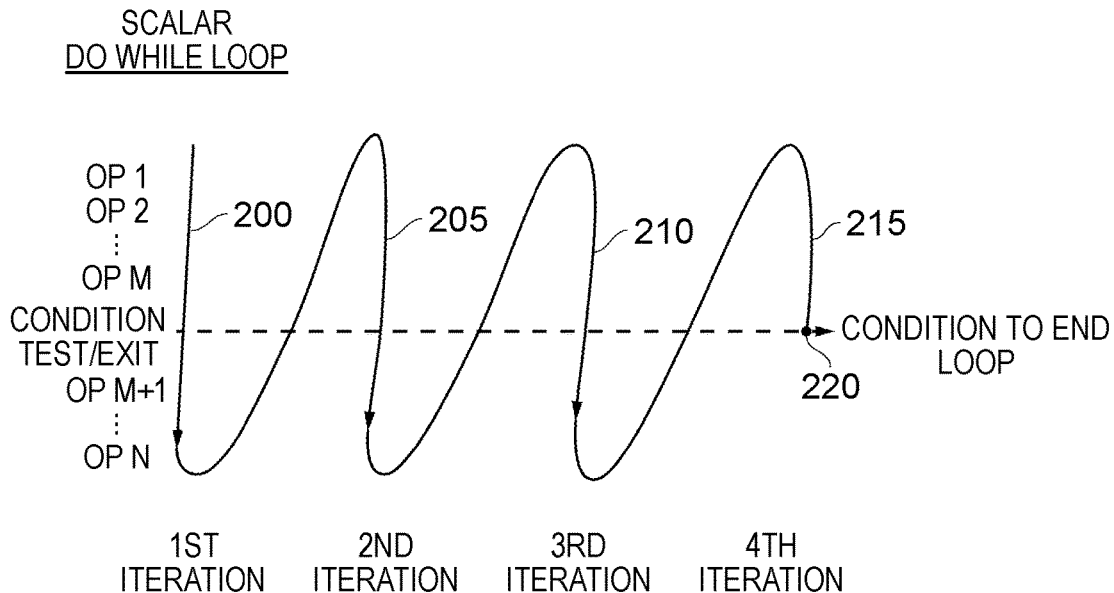
FIG. 3 schematically illustrates a loop of scalar instructions which can be vectorised using the techniques of the described embodiments.
FIGS. 4 and 5 schematically illustrate a sequence of vector instructions used to vectorise the scalar loop of FIG. 3 in accordance with one embodiment.

FIG. 3 schematically illustrates a scalar loop that can be vectorised using the earlier described embodiment. This loop of scalar instructions includes a series of instructions, some of which occur prior to a condition test being performed to determine whether to exit the loop, and some of which occur after that condition test. In the example sequence illustrated, the loop goes through three complete iterations 200, 205, 210, and then the condition test is evaluated as indicating that the loop should end at point 220 part way through the fourth iteration 215. It is often the case that the condition test is such that the number of iterations required is not known, and hence whilst in the example the loop terminates part way through the fourth iteration, it might in other instances not terminate until many more iterations have been performed, or indeed may terminate earlier.

When performing speculative vector operations in order to vectorise such a scalar loop, each scalar instruction is replaced by a vector instruction, where the specified vector operand comprises a plurality of vector elements, each vector element relating to a different iteration. Since it is not known which iteration the scalar loop will exit on, the loop cannot be vectorised by specifying vector operands having a specific number of vector elements. Instead, as shown in FIG. 4, for the equivalent vector instructions to the scalar instructions that occurred prior to the condition test, a speculation width is used to speculate as to the number of vector elements required. As discussed earlier, in one embodiment this speculation width will initially be set to a selected value such as 16, and accordingly in that example performance of each of these vector instructions will initially be replicating the performance of the equivalent scalar instruction 16 times (i.e. one time across each of 16 separate iterations). If the current speculation width gives rise to progress indications being generated which cause a speculation reduction condition to be detected, then as discussed earlier the speculation width will be reduced, whilst ensuring that at least one vector element from each vector operand continues to be processed.

When the condition test is subsequently evaluated, it can then be determined how many vector elements are required. For example, it may be evaluated that the equivalent scalar loop would have ended on the third iteration, and hence the required speculation width was three. Assuming the speculation width is still larger than three, then all of the required vector elements will have been processed. However, if the current speculation width is less than the number of iterations indicated by the condition test, then it will be required subsequently to perform at least one further iteration of the sequence of vector operations to process the remaining vector elements that are required.

Following the commit point, then the remaining vector instructions are performed non-speculatively. However, having regards to the identified width during the condition test analysis, a mask can be set to ensure that only the required number of vector elements are processed (or a number equivalent to the current speculation width if that was less than the required width, and hence a further iteration will be required). The process will then conditionally exit. In particular, if the condition test indicates that all of the required data has been written, the process will exit, whereas otherwise the process will be repeated at least one further time.

Figure 5:
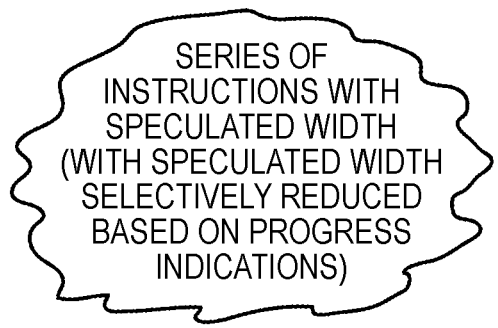
Figure 5:
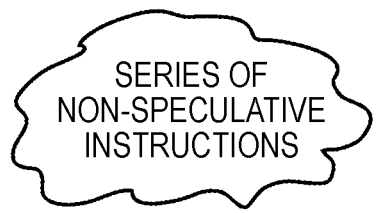

FIG. 5 illustrates a vector loop for a situation where specific speculate and commit instructions are used. The speculate instruction is used to turn on speculation, and hence set the speculation flag 105. Thereafter a series of instructions are executed speculatively with the speculation width 100 being used to identify the number of vector elements in each vector operand. As discussed earlier, the speculation width may be reduced during performance of the vector operations dependent on detection of the speculation reduction condition. Thereafter, one or more instructions will be executed to determine the appropriate width to commit, and thereafter a separate commit instruction will be executed to cause speculation to be turned off. Following this, a series of non-speculative instructions will be executed, and as discussed earlier a mask or length value can be used in association with those instructions to set the vector element width appropriately having regards to the determination made prior to the commit point. A branch instruction can then be used in order to determine whether the loop should be repeated, or the loop should exit.

Figure 6:
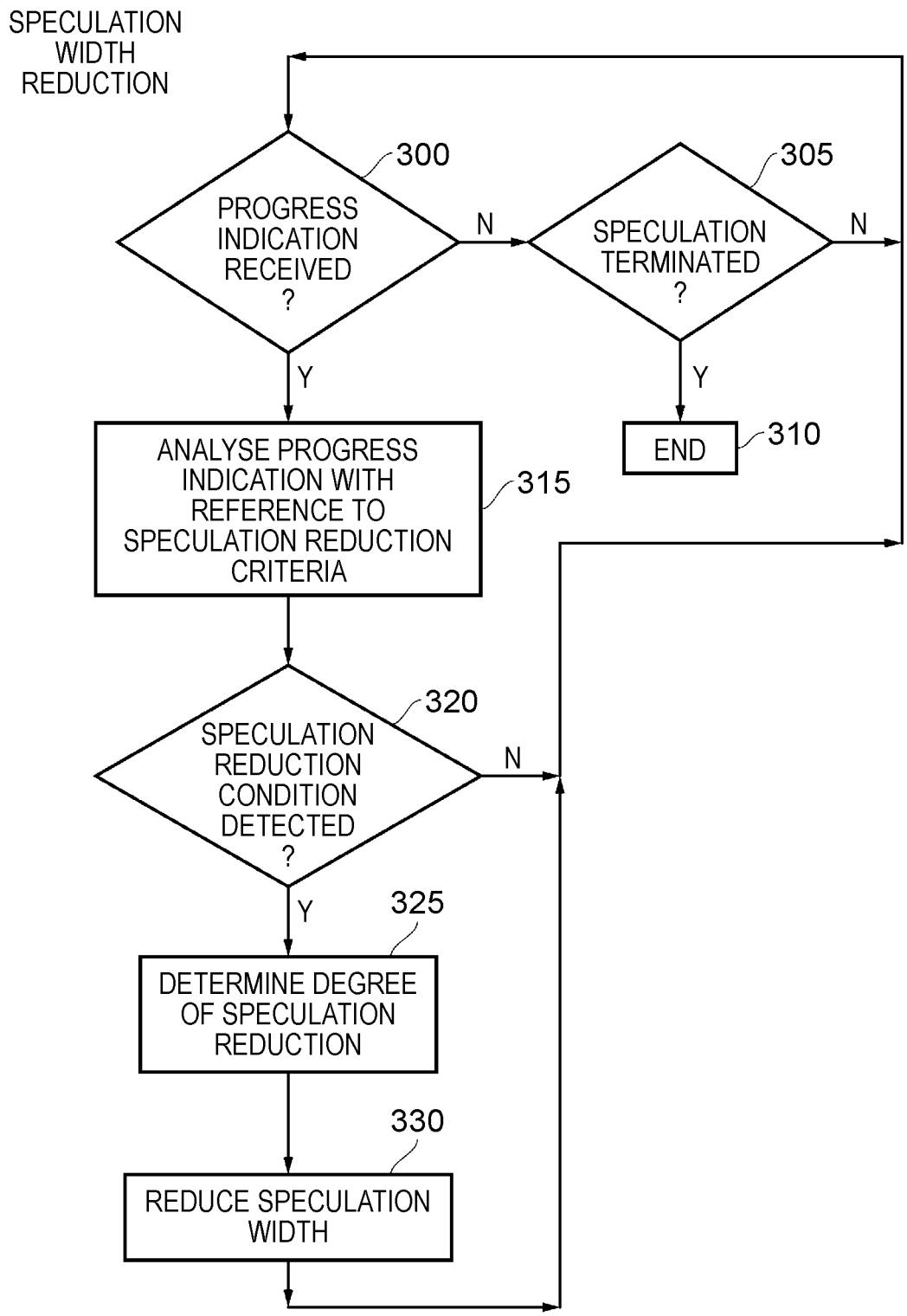
FIG. 6 is a flow diagram schematically illustrating how the speculation width is reduced in accordance with one embodiment during performance of a sequence of speculative vector operations.

FIG. 6 is a flow diagram illustrating the speculation width reduction process performed in accordance with one embodiment. At step 300, the speculation control circuitry awaits receipt of a progress indication, and if it is determined at step 300 that a progress indication has not been received, and is determined at step 305 that speculation has not been terminated, for example since the speculation flag is still asserted within the control registers 65, then the process waits at step 300 until a progress indication has been received. If speculation is terminated, the process proceeds from step 305 to 310, where the process ends.

Upon receipt of a progress indication, the speculation control circuitry 60 analyses the progress indication with reference to the speculation reduction criteria 70, at step 315, and thereafter determines at step 320 whether the speculation reduction condition has been detected. If not, the process returns to step 300. However, if the speculation reduction condition is detected, then at step 325 the speculation control circuitry determines the degree of speculation reduction required. This may be a predetermined amount, causing the speculation control circuitry to reduce the speculation width by that predetermined amount, or instead may be predetermined in terms of a rule to be applied, for example, setting the new speculation width such that the most significant element position is one to the left of the identified element position giving rise to the progress indication, thereby excluding that identified element position from the revised speculation width.

In an alternative embodiment, the degree of speculation reduction may be determined having regards to the speculation reduction criteria itself. An example of such an approach will be described later with reference to FIG. 13, where the reduction criteria maintains a slack value giving an indication of available slack in how the performance characteristic is impacted during processing of the speculative vector operations, and the amount of speculation width reduction is dynamically managed having regards to the extent to which the slack is exceeded.

Following the determination of the degree of speculation reduction at step 325, the speculation width is reduced at step 330, whereafter the process returns to step 300. As discussed previously, once the speculation width has been reduced, this information is passed over path 82 to the vector processing circuitry 30, and causes the number of vector elements processed during performance of any outstanding speculative operations to be reduced.

Figure 7:
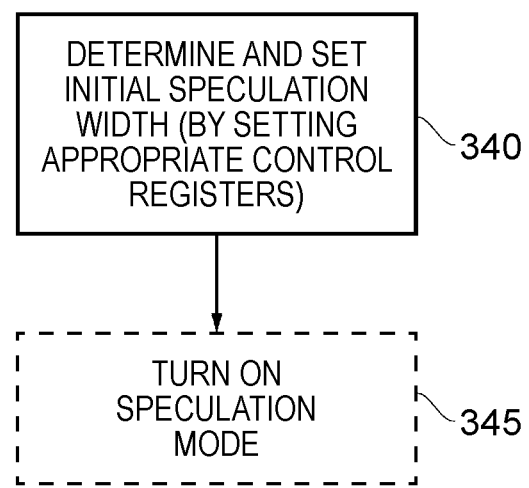
FIG. 7 is a flow diagram illustrating the steps performed when starting speculation in accordance with one embodiment.

FIG. 7 is a flow diagram illustrating a process performed when starting speculation. While speculation may be started in a variety of ways, in one embodiment an explicit start speculation instruction is provided, which when decoded by the decode circuitry 20 causes appropriate control signals to be issued to the speculation control circuitry 60. At step 340, the initial speculation width is determined and set by setting the appropriate control register(s) 65. As discussed previously, the initial speculation width may be predetermined, may be identified within the control information forwarded from the decode circuitry, or indeed an initial speculation width may be provided by the speculation prediction circuitry 85. Following step 340, a speculation mode is optionally turned on at step 345, dependent on whether the apparatus is using an explicit speculation mode or not.

Figure 8:
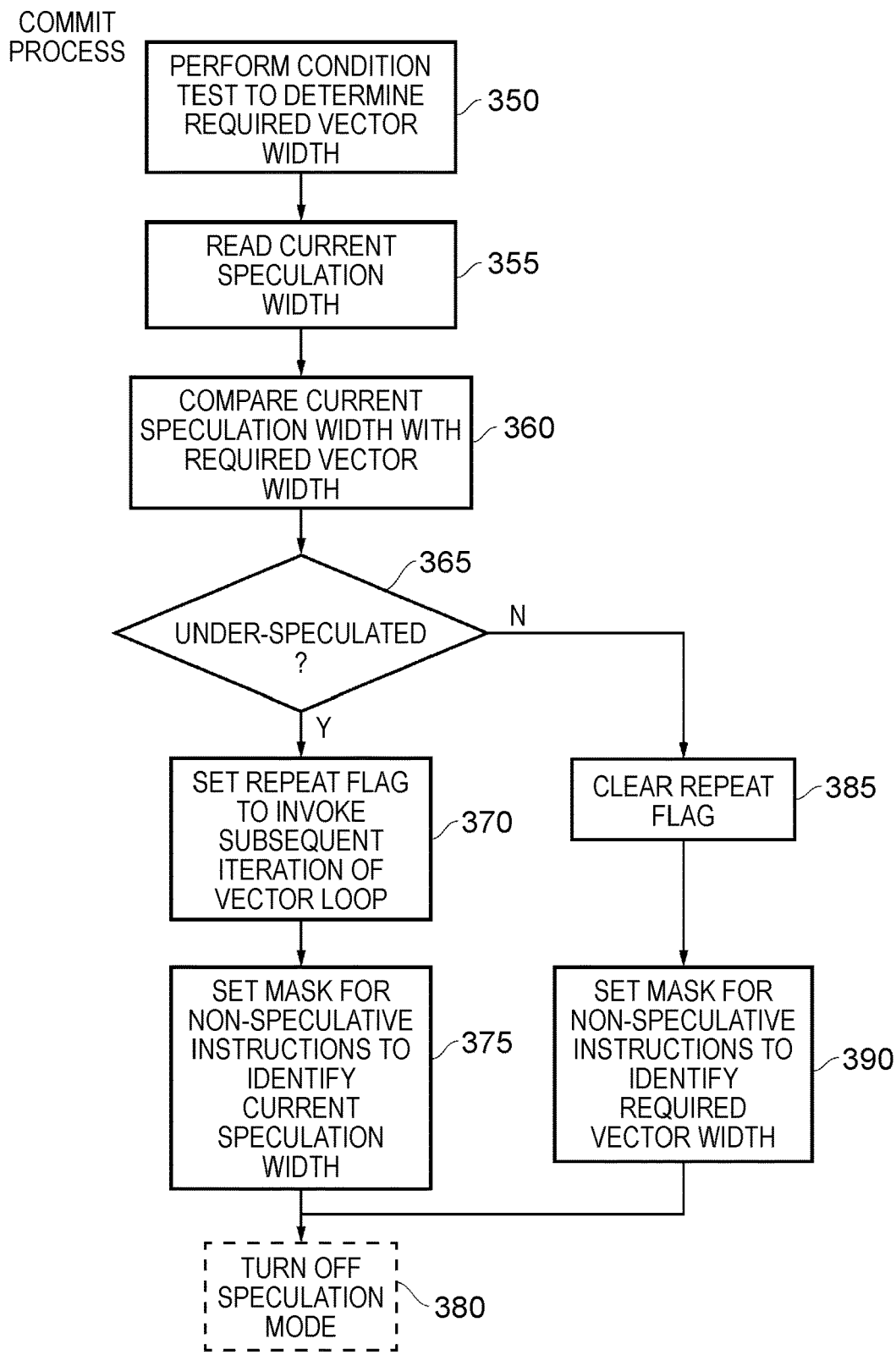
FIG. 8 is a flow diagram illustrating the steps undertaken during a commit process in accordance with one embodiment.

FIG. 8 is a flow diagram illustrating a commit process performed once the series of speculative operations within the vector loop of FIG. 5 have been performed and prior to performance of any non-speculative operations. One or more instructions may be executed in order to perform the steps illustrated in FIG. 8. At step 350, a condition test is performed to determine the required vector width, i.e. the required number of vector elements to be processed. Thereafter, at step 355 the current speculation width is read, and then at step 360 the current speculation width is compared with the required vector width.

At step 365, it is then determined whether the speculative vector operations have resulted in under speculation. This will be the case if the speculation width has been reduced to a point where it was less than the required vector width at the time the commit point was reached. Otherwise, if the current speculation width is larger than the required vector width, the process will have over speculated.

In the event of over speculation, the process proceeds to step 385, where a repeat flag is cleared, indicating that no further iteration of the vector loop is required. Thereafter, a mask is set for the non-speculative instructions to identify the required vector width, at step 390. This will enable the vector loop to have vectorised the equivalent scalar loop without requiring another iteration.

However, in the event of under speculation, then at step 370 a repeat flag is set to invoke a subsequent iteration of the vector loop. Thereafter, a mask is set at step 375 for the non-speculative instructions to identify the current speculation width. Accordingly, once the current vector loop is completed, both the speculative vector operations and non-speculative operations will have processed the same number of vector elements. The vector loop can then be repeated one or more times to handle the remaining vector elements within the required vector width.

Following steps 375 or 390, then speculation mode is turned off at step 380, in embodiments where a specific speculation mode is used. This will ensure that the following instructions within the vector loop are performed non-speculatively.

Figure 9:
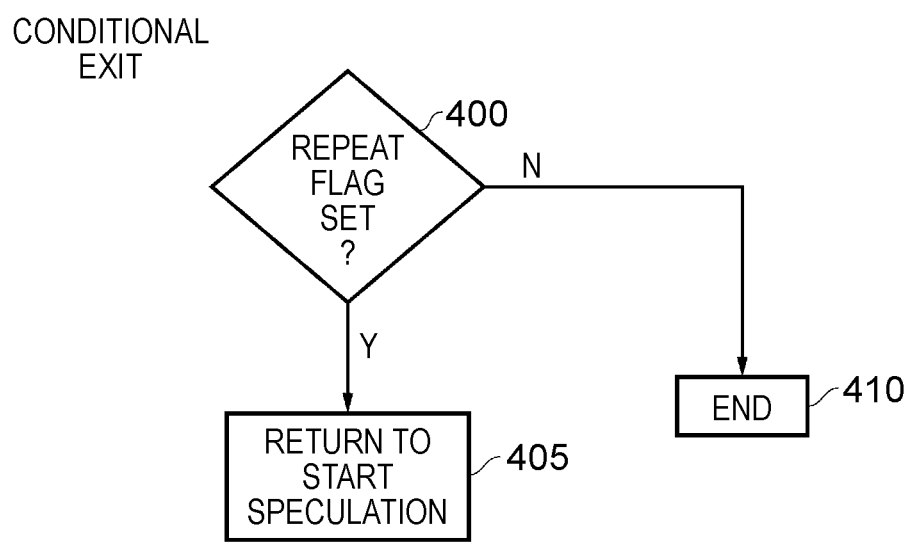
FIG. 9 is a flow diagram illustrating the steps performed at a conditional exit stage during performance of a sequence of vector operations in accordance with one embodiment.

FIG. 9 illustrates a conditional exit process that is performed typically by a branch instruction, such as that shown in FIG. 5, following execution of the series of speculative instructions and non-speculative instructions. At step 400, it is determined whether the repeat flag is set. If it is, then the process returns to the start speculation point at the beginning of the vector loop at step 405, whereas otherwise the process ends at step 410.

Figure 10A:
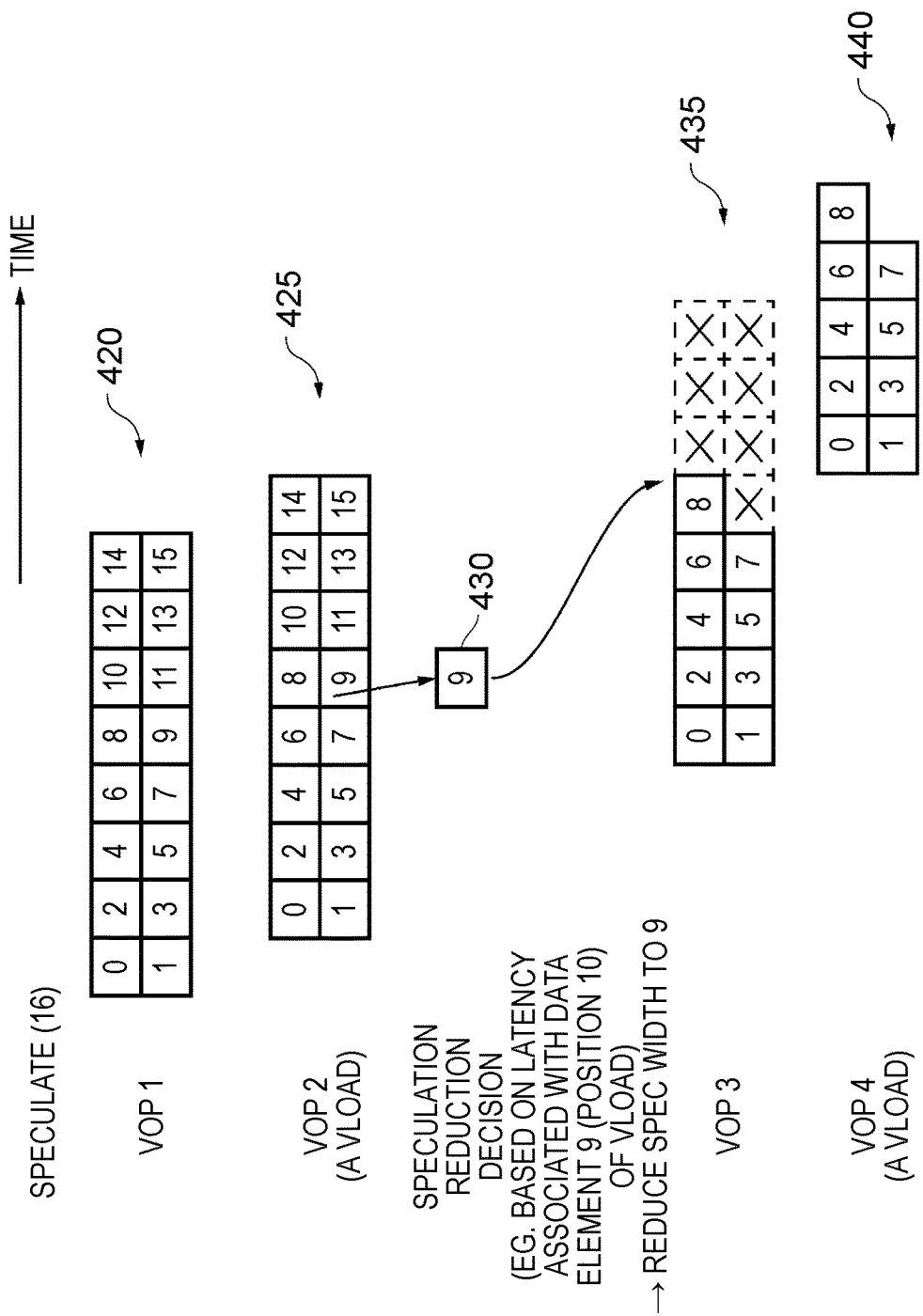
FIGS. 10A and 10B schematically illustrate how operation of pending speculative vector operations may be altered following a reduction in speculation width, in accordance with certain embodiments.

FIG. 10A is a diagram schematically illustrating how the processing of speculative vector operations changes when the speculation width is reduced. Initially, a speculate instruction is executed to turn on speculation mode and set the speculation width to a specified amount, in this example 16 vector elements. In the example illustrated, it is assumed that the components within the vector processing circuitry are able to process two vector elements from each source operand during a single cycle, and accordingly the component executing the vector operation VOP1 420 will take 8 cycles to complete all of the required operations.

In the example shown, it is assumed that there is a data dependency between VOP1 and VOP2 (VOP2 in this example being a vector load), such that the performance of VOP2 begins one cycle after the performance of VOP1 begins.

As shown in this example, when the LSU 50 is processing the vector load, it detects a micro-architectural event in association with vector element 9 (i.e. the vector element at element position 10) and issues a progress indication identifying the event and the element position, as indicated by the reference numeral 430 in FIG. 10A. Such a micro-architectural event may for example be a cache miss occurring when seeking to load vector element 9, and in this example it is assumed that when assessing that progress indication against the reduction criteria 70 the speculation control circuitry 60 decides to reduce the speculation width to a width of nine elements, thereby excluding vector element 9 (which as mentioned earlier is at element position 10). The vector operation VOP3 illustrates an example of a vector operation that has begun to be processed prior to the issuance of the progress indication and the associated speculation width reduction, but which is still in progress at the time the speculation width is reduced. As shown by the crosses within VOP3 435, the component performing VOP3 can be arranged to cull processing of any of the vector elements at element position 10 or higher, in response to the reduction in the speculation width. As discussed earlier with reference to FIG. 1, clock gating and/or power gating techniques can be used to reduce the energy consumption of the component performing VOP3, based on the reduced speculation width.

The vector operation VOP4 is illustrative of a vector operation which is only initiated after the speculation width reduction has been made, and in this example, as shown by the reference numeral 440, it will be known at the outset that (subject to no further speculation width reduction) that vector operation needs to be performed in relation to the first nine vector elements.

In the example shown in FIG. 10A, it is assumed that the vector operation VOP4 440 is another vector load operation, and that that vector load cannot begin to be performed until the earlier vector load VOP2 has completed.

Figure 10B:
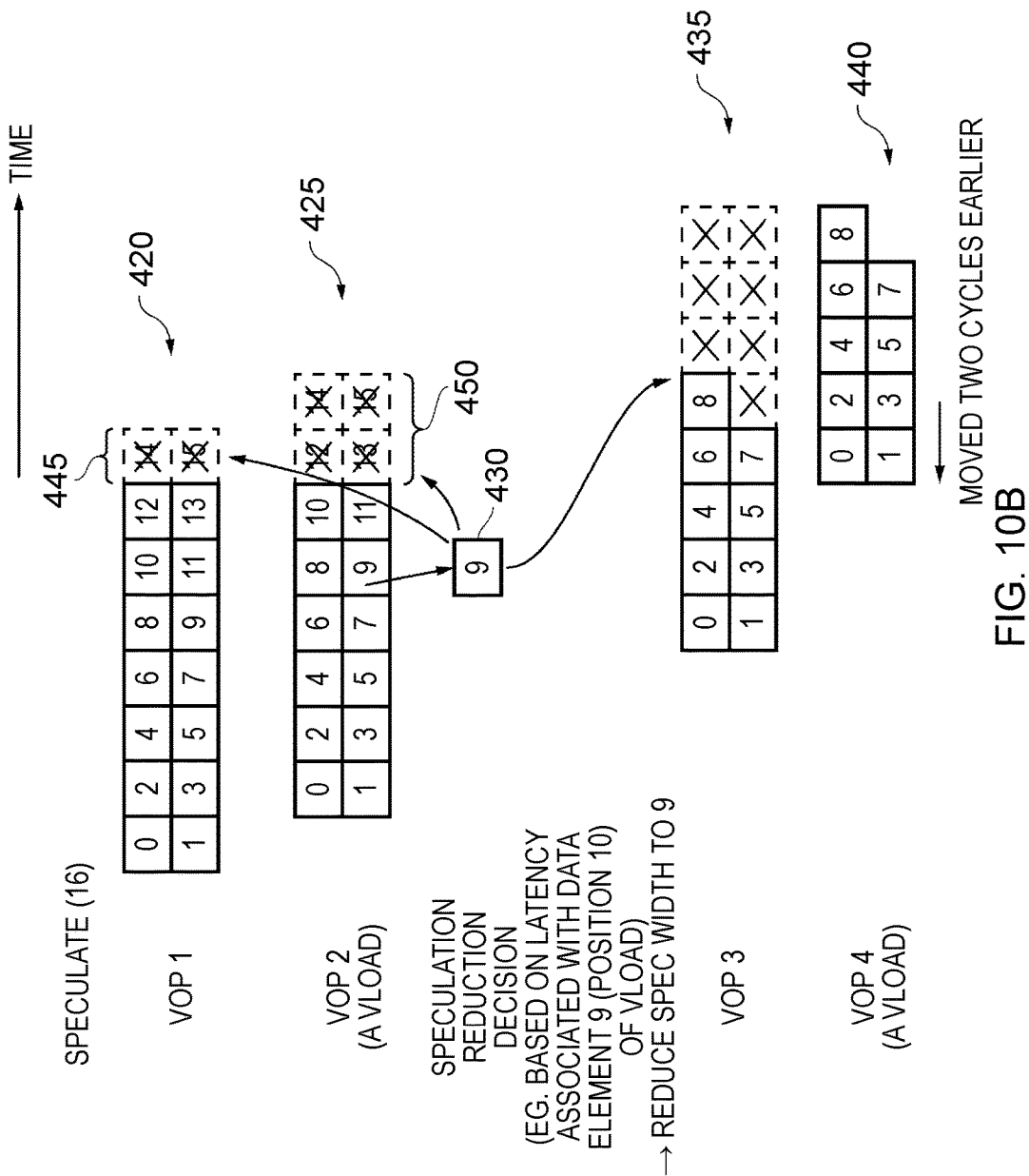

FIG. 10B illustrates an alternative embodiment where the adjustment in the speculation width not only affects the future vector operations, but also earlier vector operations. In particular, as shown by the reference numeral 450, when the speculation width is reduced, this can cause the component performing VOP2 (i.e. the vector operation that gave rise to the speculation reduction) to also terminate processing of one or more subsequent iterations, in this case the two iterations relating to the last four vector elements.

In addition, in one embodiment the process can be used to retrospectively trim the operation of vector operations that have been issued even before VOP2. In the example shown, as indicated by the reference numeral 445, the final iteration of VOP1 is also terminated based on the reduced speculation width. Again, clock and power gating techniques can be used to reduce the energy consumption of the components performing these operations. Another benefit that can be realised is to increase performance, since components will be available to process other operations more quickly. For example, considering VOP4, the LSU 50 will terminate performance of VOP2 two cycles earlier, and accordingly VOP4 can start two cycles earlier in the example of FIG. 10B when compared with the example of FIG. 10A.

Figure 11A:
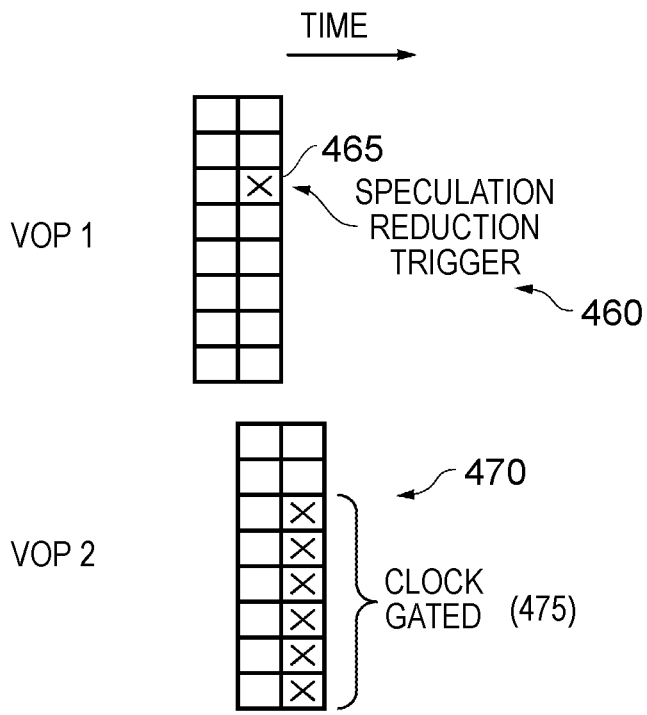
FIGS. 11A and 11B schematically illustrate how operation of pending speculative vector operations may be altered following a reduction in speculation width, in accordance with further embodiments.
Figure 11B:
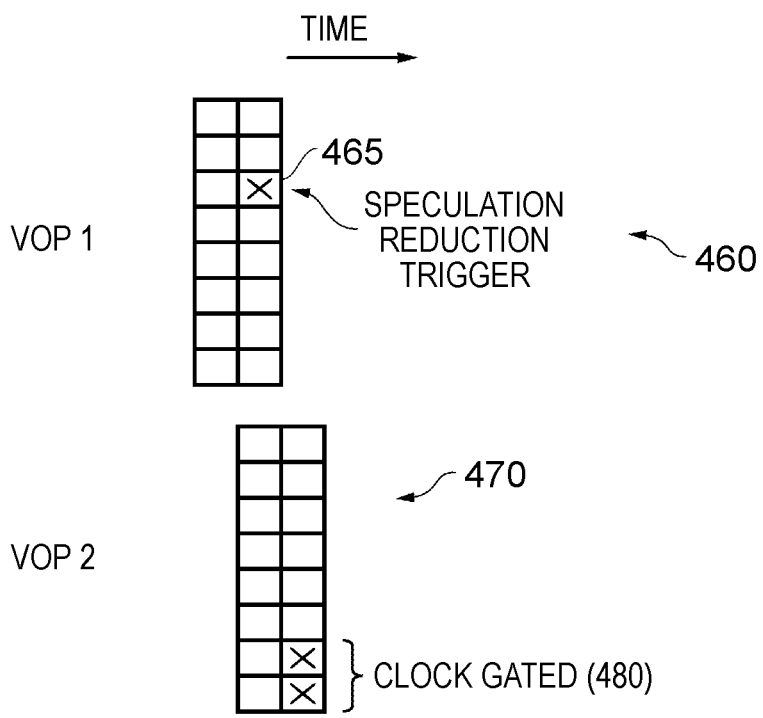

FIGS. 11A and 11B illustrate further examples of how the speculation reduction triggers a modification in the performance of subsequent operations. In this example, it is assumed that the components performing VOP1 and VOP2 are able to process eight vector elements from each source vector operand in each iteration, and accordingly the originally specified 16 vector elements can be processed in two cycles. If a speculation reduction trigger occurs at point 465 when executing VOP1 460 then this can be used to clock gate (or indeed power gate) certain of the components handling VOP2 (as indicated by the reference numeral 475), in particular for those components processing element positions on or above the element position 465 that gave rise to the speculation reduction. However, there is no requirement for all of the element positions on or above that that gave rise to the speculation reduction to be clock gated, and as shown in FIG. 11B in alternative embodiments only a subset of the higher element positions may be clock gated, as shown by reference numeral 480. As discussed later with reference to FIG. 14, this may for example be due to the speculation control circuitry 60 determining with reference to the reduction criteria that the speculation width should in fact only be trimmed by two, rather than being trimmed all the way back to exclude vector element position 465 and higher.

Figure 12A:
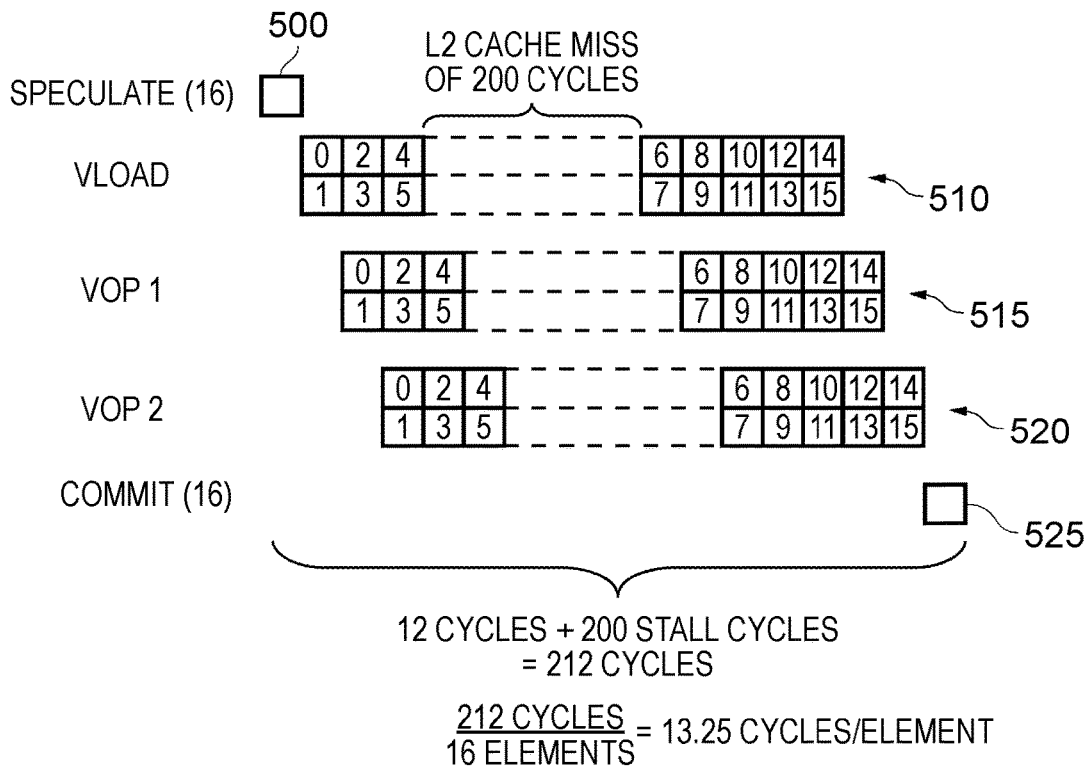
FIGS. 12A and 12B schematically illustrate the difference in performance that can be realised when using the techniques of the described embodiments (FIG. 12B) when compared with performance of speculative vector operations without the techniques of the described embodiments (FIG. 12A)

FIG. 12A illustrates how a micro-architectural event such a level 2 cache miss can introduce significant latency when performing speculative vector operations. In this example, a speculative instruction is executed at point 500 setting an initial speculation width of 16. A vector load instruction 510 is then executed, but in this instance a level 2 cache miss arises when seeking to load vector element 6 (i.e. the data element at vector element position 7). This introduces in this example 200 cycles of latency before the vector load operation is able to load vector element 6, and the remaining vector elements. This has a knock-on effect on the following two vector operations VOP1 515 and VOP2 520, due to a data dependency between those various vector operations. Another cycle is then consumed at point 525, when the commit process is performed, the speculation width still being 16 at this point. As can be seen, this results in a total of 212 cycles to perform the required vector operations, which is an average of 13.25 cycles per vector element.

Figure 12B:
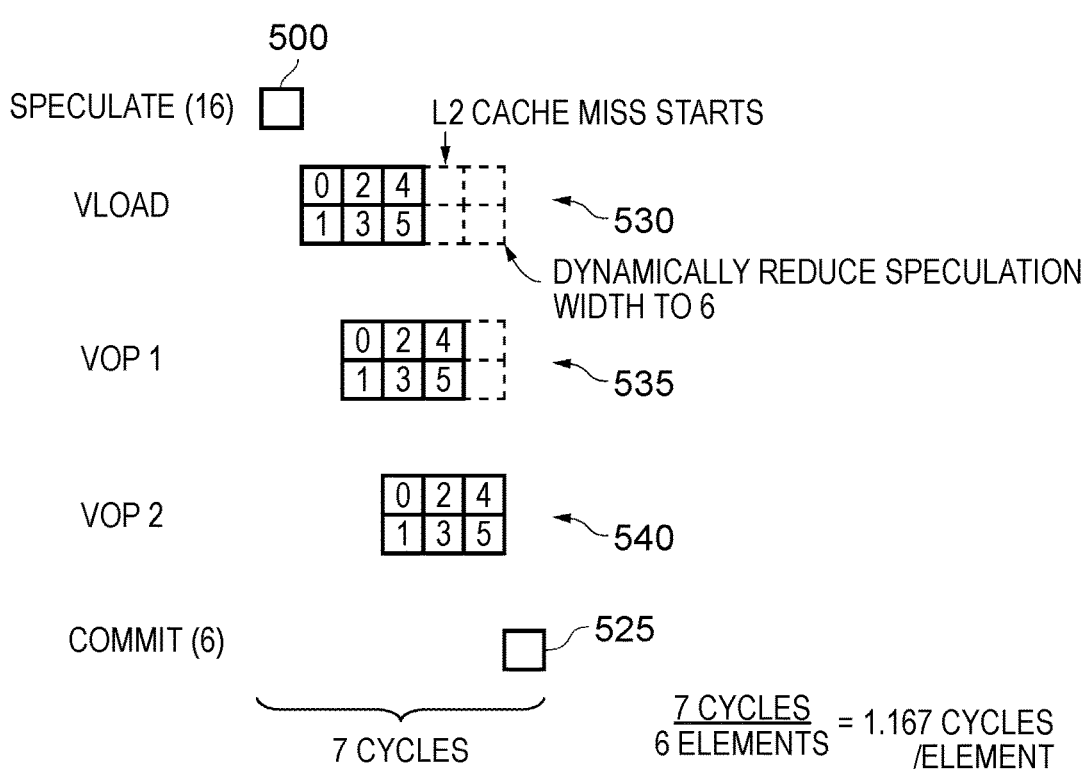

FIG. 12B in contrast shows the situation when the adaptive speculation width approach of the described embodiments as used. Whilst at step 500, the speculation width is again initially set to 16, when the level 2 cache miss is detected in relation to data element 6 (element position 7) of the vector load operation 530, this causes the speculation control circuitry 60 to dynamically reduce the speculation width to 6 after a short delay (due to the time taken to assess the progress indication against the reduction criteria and determine the reduction to be made). As a result of the reduced speculation width, VOP1 535 and VOP2 540 only process the first six element positions, and accordingly as soon as the first six elements of VOP2 have been performed then the commit process can be performed at point 525, based on the current speculation width of 6. As a result, the process takes seven cycles in order to process six elements, which is an average of 1.167 cycles per vector element.

Assuming at the commit point it is determined that the required speculation width was six or less, then no further iterations of the vector loop will be required and the process will complete. If instead the required vector width is determined to be larger than six, then one or more further iterations of the vector loop will need to be performed to process the remaining elements. Nevertheless, this can still give rise to a significant increase in performance, since it may well be that by the time the subsequent iteration is performed, there is no longer a level 2 cache miss occurring in relation to vector element 6, and accordingly the subsequent iteration proceeds much more efficiently.

Figure 13:
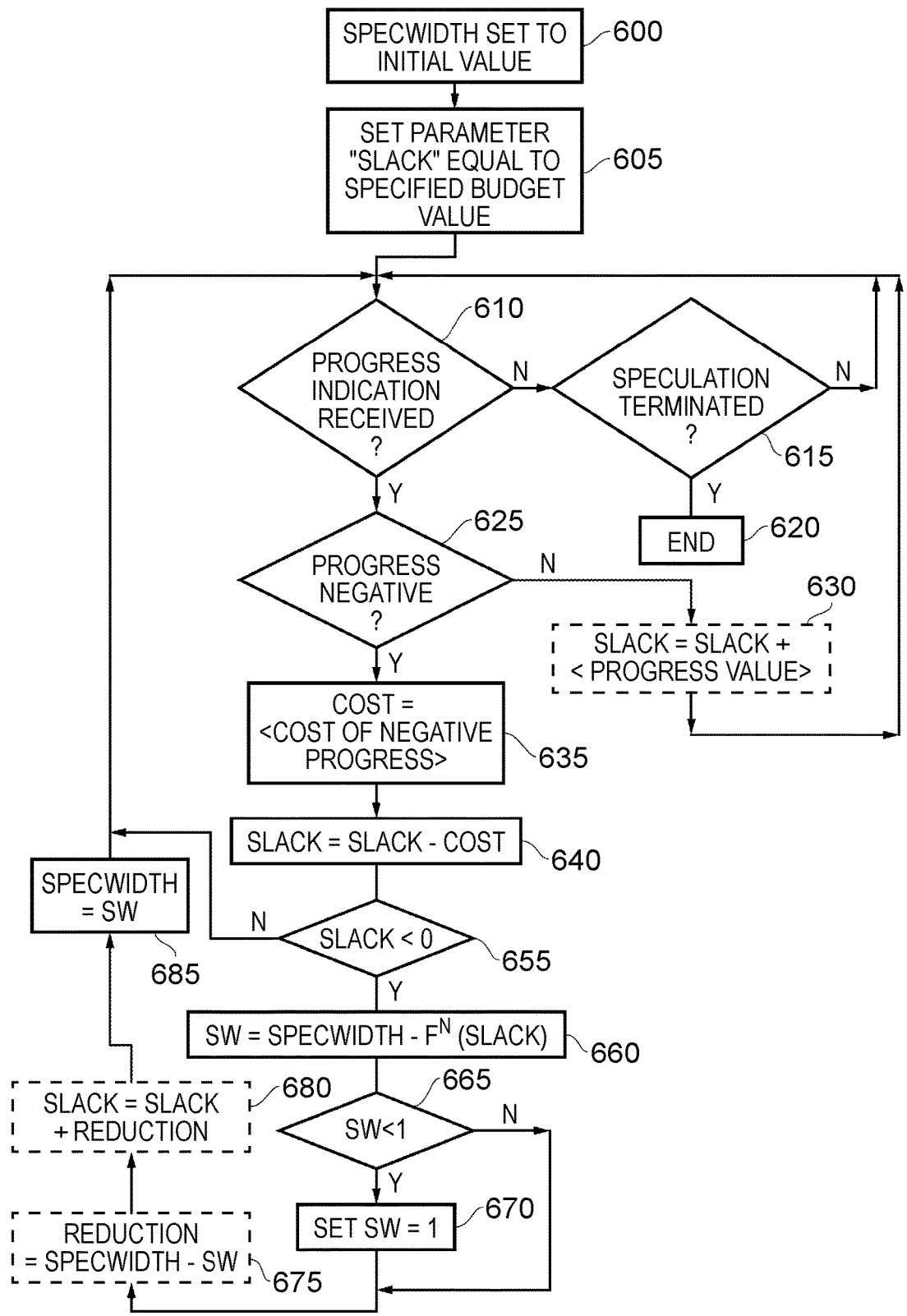
FIG. 13 is a flow diagram illustrating how the speculation width may be adjusted in embodiments where the reduction criteria includes performance tolerance information in the form of a slack indication, in accordance with one embodiment.

Whilst the speculation reduction criteria may specify directly the one or more criteria that, if met, indicate the presence of the speculation reduction condition, alternatively, or in addition, the speculation reduction criteria may comprise performance tolerance information that is maintained by the speculation control circuitry, and adjusted having regards to the progress indications generated during performance of the sequence of speculative vector operations. FIG. 13 is a flow diagram illustrating performance of the speculation reduction process in accordance with one such embodiment, where the performance tolerance information takes the form of a slack indication providing an indication of the available slack in how the performance characteristic is impacted during processing of the speculative vector operations.

At step 600, the speculation width is set to an initial value at the start of speculation, and at step 605 the parameter "slack" is set to some specified budget value. This value may be provided by the instruction that starts speculation, may be preset, or may be provided in other ways, for example from the speculation prediction circuitry 85 in embodiments incorporating such prediction circuitry.

At step 610, it is determined whether a progress indication has been received, and if not it is then determined at step 615 whether speculation has been terminated. If it has, then the process ends at step 620, but otherwise the process returns to step 610.

When a progress indication is received, it is determined whether that progress indication indicates a negative impact on the performance characteristic or a positive impact. In particular, in one optional embodiment the processing circuitry 30 may provide progress indications not only relating to events having a negative impact on the performance characteristic, but also relating to certain events having a positive impact, for example indicating that certain operations have been performed more quickly than expected. In the event of a positive progress indication, then the slack value is increased at step 630 by an amount indicated by the progress indication, whereafter the process returns to step 610.

In contrast, in the event of a negative progress indication being detected at step 625, a parameter "cost" is evaluated at step 635, this being indicative of the performance cost associated with that negative indication. Thereafter the slack value is adjusted by subtracting the cost value from the current slack value. At step 655 it is then determined whether the slack value is now negative, and if not the process returns to step 610.

If at step 655, it is determined that the slack value is negative, then an internal parameter (SW) is set by subtracting from the current speculation width a value determined as a function of the current slack value. The function can be set in a variety of ways, but in one example it will cause a larger amount to be deducted from the speculation width the larger negative the slack value is.

At step 665, it is detected whether the parameter SW is less than 1. If it is, then SW is set equal to 1 at step 670 before the process proceeds to step 675, whereas otherwise the process proceeds directly to step 675 from step 665. The purpose of steps 665, 670 is to ensure that the internal parameter SW is never reduced below 1, in order to ensure that the current iteration of the vector loop will always produce some positive progress. In particular, at step 685, the speculation width will be set equal to SW, and accordingly will be set to a value of 1 or greater, prior to the process returning to step 610.

Step 675 and 680 are optional, and at step 675 an internal parameter "reduction" is determined by subtracting the internal parameter SW from the current speculation width (i.e. the speculation width prior to adjustment at step 685). Thereafter, at step 680 the slack value is increased by the determined "reduction" value. The speculation width is then reduced at step 685. When using the optional steps 675, 680, it will hence be seen that whenever the speculation width is reduced, the slack value is adjusted positively dependent upon the amount that the speculation width is reduced.

Figure 14A:
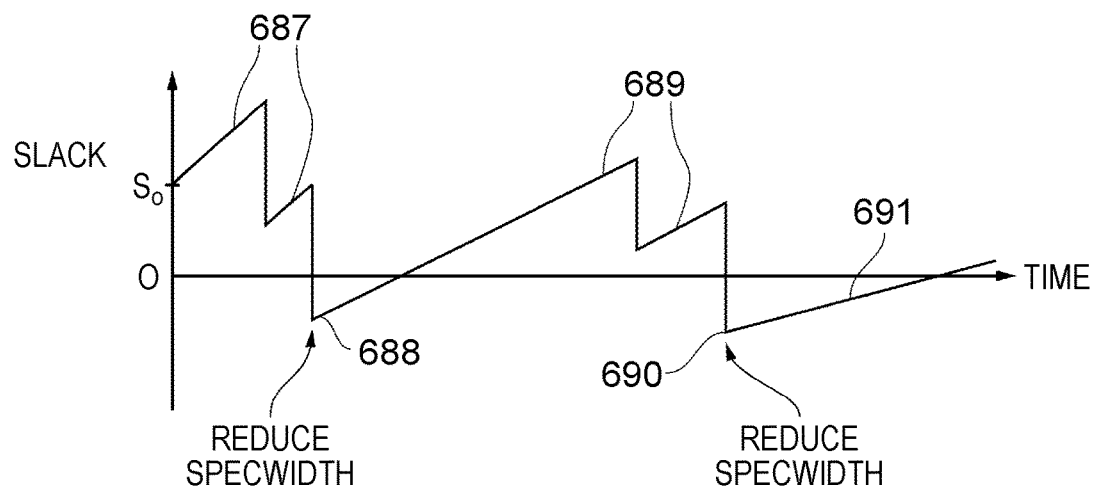
FIGS. 14 A and 14 B schematically illustrate how the slack indication may vary when adopting the approach of FIG. 13, in accordance with two embodiments.
Figure 14B:
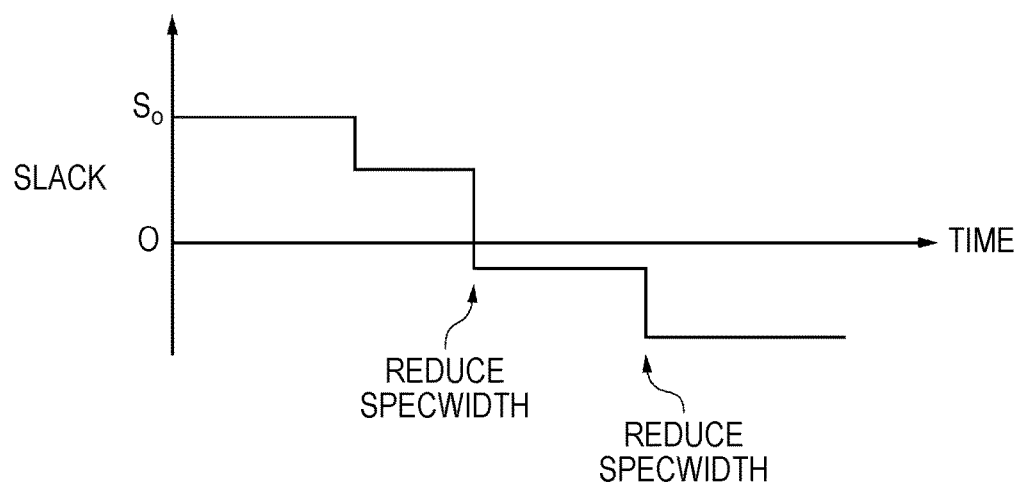

FIGS. 14A and 14B schematically illustrate how the slack value may vary when performing the process of FIG. 13. In the example of FIG. 14A, it is assumed that optional step 630 is performed. As shown by the slopes 687, the slack value initially increases following some positive indications received over path 80. A negative indication causes a first drop in the slack value, and then a second negative indication causes the slack value to drop to a negative value at points 688. At this point, the speculation width is reduced, and the slack value is adjusted positively by the amount of the reduction. Continued positive progress indications as indicated by the slopes 689 cause the slack value to increase further, but again after two negative progress indications, the slack value returns negative at point 690. This again causes the speculation width to be reduced, and optionally the slack value to be increased based on the reduction in the speculation width. Positive progress indications then cause the slack value to follow the line 691.

In one embodiment, the amount by which the slack value is adjusted positively on receipt of positive indications is dependent on the speculation width. In particular, the higher the speculation width, the greater the overall effect of the positive indications, and accordingly the slopes 687 have a steeper gradient than the slopes 689, and similarly the slopes 689 have a steeper gradient than the slope 691.

In FIG. 14A, it is assumed that the optional steps 675, 680 are not performed, and hence the slack value is not adjusted in a positive direction to compensate for the reduction in speculation width. However, in an alternative embodiment steps 675 and 680 would be performed, and as a result at points 688, 690 there would be a positive jump in the slack value prior to the slopes 689, 691 being followed. The positive jump in the slack value may or may not take the slack value positive again, since this will depend on the function of the slack value applied at step 660, and accordingly the extent of the reduction in the speculation width that takes place.

FIG. 14B illustrates an example where no positive progress indications are received, and accordingly the slack value starts at an initial budget value, and then decreases in steps as each negative indication is received. Each time there is a drop in the slack value after the slack value becomes negative, the speculation width is reduced.

Figure 15:
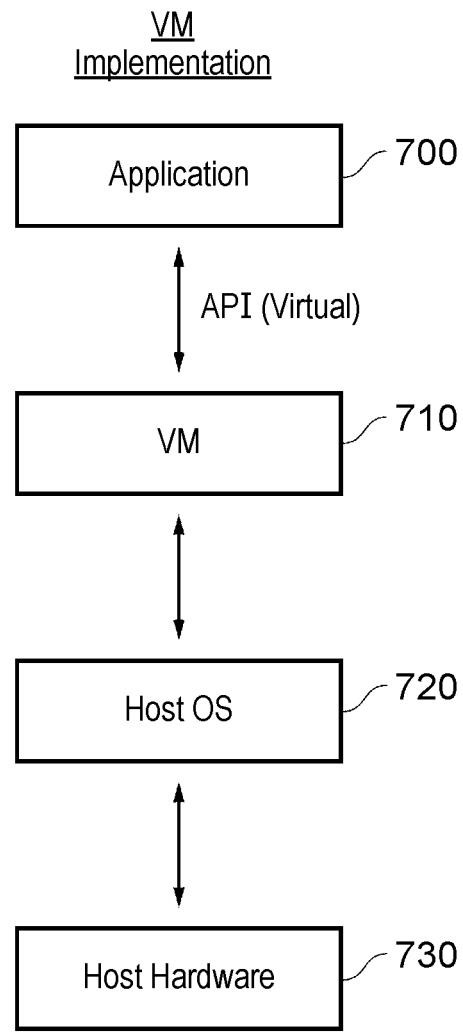
FIG. 15 schematically illustrates a virtual machine implementation of the data processing apparatus in accordance with one embodiment.

FIG. 15 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 730 typically running a host operating system 720 supporting a virtual machine program 710. Often, large powerful processors are required to provide virtual machine implementations which execute at a reasonable speed, but such an approach may be justified in certain circumstances, such as when there is a desire to run code native to another processor for compatibility or re-use reasons. The virtual machine program 710 is capable of executing an application program (or operating system) 700 to give the same results as would be given by execution of the program by such a real hardware device. Thus, the program instructions, including the speculative vector instructions described above, may be executed from within the application program 700 using the virtual machine program 710.

Through use of the above described techniques, at least one performance characteristic of the data processing apparatus (such as throughput or energy consumption) can be improved whilst performing speculative vector operations, by seeking to avoid situations where performance of the speculative vector operations at a particular speculation width will have an undue adverse impact on that chosen performance characteristic. By such an approach, the speculation width can be dynamically adjusted in order to seek to avoid doing time consuming or energy hungry work that may not be needed, hence saving time and energy. To guarantee progress, in one embodiment the speculation width is never reduced below one element.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
processing circuitry configured to perform a sequence of speculative vector operations on vector operands, each vector operand comprising a plurality of vector elements;
speculation control circuitry configured to maintain a speculation width indication indicating the number of vector elements of each vector operand to be subjected to said speculative vector operations, the speculation width indication being initialised to an initial value prior to performance of said sequence of speculative vector operations;
said processing circuitry being configured to generate progress indications during performance of said sequence of speculative vector operations;
the speculation control circuitry being further configured to detect, with reference to the progress indications and speculation reduction criteria, presence of a speculation reduction condition, the speculation reduction condition being a condition indicating that a reduction in the speculation width indication is expected to improve at least one performance characteristic of the data processing apparatus relative to continued operation without the reduction in the speculation width indication;
the speculation control circuitry being further responsive to detection of said speculation reduction condition to reduce the speculation width indication.

2. A data processing apparatus as claimed in claim 1, wherein said progress indications are indicative of throughput impacting events occurring within the processing circuitry during performance of said speculative vector operations.

3. A data processing apparatus as claimed in claim 1, wherein said progress indications are indicative of energy consumption impacting events occurring within the processing circuitry during performance of said speculative vector operations.

4. A data processing apparatus as claimed in claim 1, wherein said progress indications are issued in response to micro-architectural events occurring within the processing circuitry during performance of said speculative vector operations.

5. A data processing apparatus as claimed in claim 1, wherein said speculation width indication further identifies a first vector element of each vector operand to be subjected to said speculative vector operations.

6. A data processing apparatus as claimed in claim 5, wherein said speculation width indication identifies the number of vector elements of each vector operand to be subjected to said speculative vector operations as being a specified number of sequential vector elements starting from said first vector element.

7. A data processing apparatus as claimed in claim 1, wherein:
said processing circuitry is configured to execute a vector loop of instructions, the vector loop including instructions defining said sequence of vector operations and at least one evaluation instruction executed at a commit point within the vector loop following performance of said sequence of vector operations, execution of said at least one evaluation instruction causing a required vector width to be determined;
the speculation control circuitry being responsive to determination of said required vector width to determine with reference to a current value of said speculation width indication whether performance of said sequence of vector operations resulted in an over-speculation or an under-speculation, and in the event of said under-speculation to set a repeat flag to cause a further iteration of said vector loop of instructions to be executed.

8. A data processing apparatus as claimed in claim 7, wherein upon a further iteration of said vector loop of instructions, said speculation control circuitry is configured to initialise the speculation width indication to a modified initial value having regard to the number of vector elements processed during the preceding iteration of the vector loop of instructions.

9. A data processing apparatus as claimed in claim 7, wherein said vector loop includes one or more non-speculative instructions to be executed after said commit point, the speculation control circuitry further being configured to set a mask value to identify the number of vector elements of each vector operand to be subjected to the non-speculative operations defined by said one or more non-speculative instructions.

10. A data processing apparatus as claimed in claim 1, further comprising:
a vector register bank configured to store the vector operands for access by said processing circuitry;
said processing circuitry including data access circuitry configured to perform vector access operations in order to move vector operands between the vector register bank and a memory system including at least one level of cache storage;
said data access circuitry being configured to issue as said progress indications information relating to cache misses occurring during performance of said vector access operations.

11. A data processing apparatus as claimed in claim 10, further comprising a translation lookaside buffer (TLB) referenced by the data access circuitry during performance of said vector access operations, said data access circuitry further being configured to issue as said progress indications information relating to TLB misses occurring during performance of said vector access operations.

12. A data processing apparatus as claimed in claim 1, wherein the data processing circuitry is responsive to said reduction in the speculation width indication to alter the number of vector elements of each vector operand subjected to selected vector operations occurring in said sequence starting with the vector operation whose progress indications resulted in detection of the speculation reduction condition that caused said speculation width indication to be reduced.

13. A data processing apparatus as claimed in claim 12, wherein the data processing circuitry is further responsive to said reduction in the speculation width indication to alter the number of vector elements of each vector operand subjected to non-completed vector operations occurring in said sequence before the vector operation whose progress indications resulted in detection of the speculation reduction condition that caused said speculation width indication to be reduced.

14. A data processing apparatus as claimed in claim 1, further comprising control circuitry configured to be responsive to reduction in the speculation width indication to reduce power consumption within one or more components of the processing circuitry.

15. A data processing apparatus as claimed in claim 14, wherein the control circuitry employs at least one of clock gating and power gating to reduce power consumption within said one or more components.

16. A data processing apparatus as claimed in claim 1, wherein at least one of the initial value to which the speculation width indication is initialised, and the speculation reduction criteria, is specified by an instruction to be executed by the data processing apparatus.

17. A data processing apparatus as claimed in claim 1, wherein at least one of the initial value to which the speculation width indication is initialised, and the speculation reduction criteria, is predetermined.

18. A data processing apparatus as claimed in claim 1, further comprising:
prediction circuitry configured to maintain history data relating to speculation width values used at a commit point for sequences of speculative vector operations previously performed by the processing circuitry;
the prediction circuitry being configured, for a current sequence of speculative vector operations to be performed by the processing circuitry, to determine with reference to the history data the initial value to which the speculation width indication is to be set prior to performance of said current sequence of speculative vector operations.

19. A data processing apparatus as claimed in claim 1, further comprising:
prediction circuitry configured to maintain history data relating to speculation reduction criteria used for sequences of speculative vector operations previously performed by the processing circuitry;
the prediction circuitry being configured, for a current sequence of speculative vector operations to be performed by the processing circuitry, to determine with reference to the history data the speculation reduction criteria to be used for performance of said current sequence of speculative vector operations.

20. A data processing apparatus as claimed in claim 1, wherein the speculation control circuitry is responsive to execution of a start speculation instruction to trigger a speculative mode of operation, the processing circuitry being configured to perform said speculative vector operations in response to instructions executed during said speculative mode of operation.

21. A data processing apparatus as claimed in claim 20, wherein the speculation control circuitry is responsive to execution of a commit instruction to terminate said speculative mode of operation.

22. A data processing apparatus as claimed in claim 1, wherein the speculation control circuitry is responsive to the speculation reduction condition to modify the speculation width indication to indicate that at least one vector element of each vector operand is to be subjected to said speculative vector operations.

23. A data processing apparatus as claimed in claim 1, wherein:
said speculation reduction criteria comprises performance tolerance information that is maintained by the speculation control circuitry;
the speculation control circuitry is configured to adjust the performance tolerance information having regard to the progress indications generated during performance of said sequence of speculative vector operations; and
the speculation control circuitry is configured to detect the speculation reduction condition if the performance tolerance information reaches a trigger point.

24. A data processing apparatus as claimed in claim 23, wherein the speculation control circuitry references the performance tolerance information when determining an amount by which the speculation width indication is to be reduced.

25. A data processing apparatus as claimed in claim 1, wherein an amount by which the speculation width indication is to be reduced on detection of said speculation reduction condition is predetermined.

26. A method of controlling performance of speculative vector operations comprising:
performing a sequence of speculative vector operations on vector operands, each vector operand comprising a plurality of vector elements;
maintaining a speculation width indication indicating the number of vector elements of each vector operand to be subjected to said speculative vector operations, the speculation width indication being initialised to an initial value prior to performance of said sequence of speculative vector operations;
generating progress indications during performance of said sequence of speculative vector operations;
detecting, with reference to the progress indications and speculation reduction criteria, presence of a speculation reduction condition, the speculation reduction condition being a condition indicating that a reduction in the speculation width indication is expected to improve at least one performance characteristic of the data processing apparatus relative to continued operation without the reduction in the speculation width indication; and
on detection of said speculation reduction condition, reducing the speculation width indication.

27. A non-transitory computer-readable storage medium storing a computer program for controlling a computer to provide a virtual machine execution environment for program instructions corresponding to a data processing apparatus as claimed in claim 1.

28. A data processing apparatus comprising:
processing means for performing a sequence of speculative vector operations on vector operands, each vector operand comprising a plurality of vector elements;
speculation control means for maintaining a speculation width indication indicating the number of vector elements of each vector operand to be subjected to said speculative vector operations, the speculation width indication being initialised to an initial value prior to performance of said sequence of speculative vector operations;
said processing means for generating progress indications during performance of said sequence of speculative vector operations;
the speculation control means for detecting, with reference to the progress indications and speculation reduction criteria, presence of a speculation reduction condition, the speculation reduction condition being a condition indicating that a reduction in the speculation width indication is expected to improve at least one performance characteristic of the data processing apparatus relative to continued operation without the reduction in the speculation width indication;
the speculation control means for responding to detection of said speculation reduction condition by reducing the speculation width indication.

* * * * *